(12) United States Patent
Hanwright et al.

(10) Patent No.: US 8,248,203 B2
(45) Date of Patent: Aug. 21, 2012

(54) REMOTE MONITOR/CONTROL FOR BILLBOARD LIGHTING OR STANDBY POWER SYSTEM

(76) Inventors: Martin James Hanwright, Mundelein, IL (US); Shih-Chiea Chen, Taipei (TW)

( * ) Notice: Subject to any disclaimer, the term of this patent is extended or adjusted under 35 U.S.C. 154(b) by 1010 days.

(21) Appl. No.: 12/210,877

(22) Filed: Sep. 15, 2008

(65) Prior Publication Data

US 2010/0066484 A1    Mar. 18, 2010

(51) Int. Cl.
*H04B 7/00* (2006.01)
(52) U.S. Cl. ........ 340/3.44; 340/3.8; 340/3.7; 455/66.1; 455/67.11
(58) Field of Classification Search ................. 340/3.44, 340/3.8, 3.7, 815.4, 814.47, 815.49, 815.6, 340/693.5; 700/291, 292, 293, 294
See application file for complete search history.

(56) References Cited

U.S. PATENT DOCUMENTS

| | | |
|---|---|---|
| 4,990,896 A | 2/1991 | Gray |
| 5,612,741 A | 3/1997 | Loban et al. |
| 6,002,450 A | 12/1999 | Darbee et al. |
| 6,060,993 A | 5/2000 | Cohen |
| 6,252,522 B1 | 6/2001 | Hampton et al. |
| 6,278,499 B1 | 8/2001 | Darbee et al. |
| 6,484,011 B1 | 11/2002 | Thompson et al. |
| 6,484,148 B1 | 11/2002 | Boyd |
| 6,504,580 B1 | 1/2003 | Thompson et al. |
| 6,553,336 B1 | 4/2003 | Johnson et al. |
| 6,571,279 B1 | 5/2003 | Herz et al. |
| 6,639,578 B1 | 10/2003 | Comiskey et al. |
| 6,897,763 B2 | 5/2005 | Schulmerich et al. |
| 6,907,029 B2 | 6/2005 | Brabrand |
| 6,961,555 B1 | 11/2005 | Philyaw |
| 7,015,902 B2 | 3/2006 | Nagai et al. |
| 7,071,895 B2 | 7/2006 | Wampler |
| 7,079,810 B2 | 7/2006 | Petite et al. |
| 7,098,870 B2 | 8/2006 | Wampler et al. |
| 7,103,368 B2 | 9/2006 | Teshima |
| 7,138,991 B2 | 11/2006 | Tsuji |
| 7,178,941 B2 | 2/2007 | Roberge et al. |
| 7,274,305 B1 | 9/2007 | Luttrell |
| 7,366,892 B2 | 4/2008 | Spaur et al. |
| 7,369,058 B2 | 5/2008 | Gothard |

*Primary Examiner* — Nabil Syed
(74) *Attorney, Agent, or Firm* — Meroni & Meroni, P.C.; Charles F. Meroni, Jr.; Christopher J. Scott

(57) ABSTRACT

A lighting monitor/control system for remote billboards uses a cellular network to provide utility power and light status information to a central controller, which in response provides control signals to individual remote billboard lighting controllers for setting operating parameters such as multiple on/off times, lighting power adjustments for individual billboards, and custom lighting schedules based upon geographic and environmental considerations. Battery back-up is provided in the event of utility power outage with automatic reversion to utility power when restored. Immediate notification of failure of utility power or of individual lamp or ballast failure is provided by SMS messaging formatted so as to minimize the number of messages and reduce communications costs. The monitor/control system is also adapted for use in remote power monitoring applications to automatically switch to standby power (generator) in the absence of primary power and to return to primary power when restored.

33 Claims, 32 Drawing Sheets

Controller Block Diagram

FIG. 12

Example of Web based application – Alerts screen

- Home
- Customers Overview
- Operating Sites Overview
- Keyword Search
- Login User Management
- Logout Personal Profile Modify Profile Dealer Management Customers Overview | Operating Sites Overview | Login User Management | Keyword Search Alerts Overview Customer: ABC

| Site | Unit | Unhandled Alerts | Total Alerts |
|---|---|---|---|
| | | | |

Customer: XYZ

| Site | Unit | Unhandled Alerts | Total Alerts |
|---|---|---|---|
| | | | |

Customer: LMR

| Site | Unit | Unhandled Alerts | Total Alerts |
|---|---|---|---|
| LMRFST03 | LMR00001 | 67 alerts | 65 alerts |
| LMRFST09 | LMR00009 | 39 alerts | 39 alerts |
| LMRFST10 | LMR00010 | 29 alerts | 29 alerts |
| LMRFST02 | LMR00002 | 59 alerts | 59 alerts |
| LMRFST03 | LMR00003 | 52 alerts | 52 alerts |
| LMRFST04 | LMR00004 | 47 alerts | 47 alerts |
| LMRFST05 | LMR00005 | 55 alerts | 55 alerts |
| LMRFST06 | LMR00006 | 51 alerts | 51 alerts |
| LMRFST07 | LMR00007 | 52 alerts | 52 alerts |
| LMRFST08 | LMR00008 | 49 alerts | 49 alerts |

FIG. 13

Lighting Controller Unit Profile

| | |
|---|---|
| SIM Card Number: | 15007925729 |
| Unit Description: | Panel # 2122/2123 |
| Assigned Unit ID: | LMR00002 |
| Assigned Site ID: | LMRTST02 |
| Plant Number: | 258 |
| Region Number: | 0001 |
| Power Source: | 220VAC - 240VAC |
| | |
| Initial Installation Date: | 2008/05/29, 11:51:43 |
| Self-test completed on: | 2008/06/06, 16:18:55 |
| Controller RTC time: | 2008/06/09, 14:21:56 |
| DST 1 (start, end): | 2008/03/09, 2008/11/02 |
| DST 2 (start, end): | 2009/03/08, 2009/11/01 |
| Firmware Version: | 060608-WMC-test1 |

[ Modify Controller's Profile ]

Real-time Controller Status:

Controller Status

| Alerts | | | | | | | Schedule 1 | Schedule 2 | Schedule 3 |
|---|---|---|---|---|---|---|---|---|---|
| Unhandled | Total | Face | Amps | Lights | Status | | | | |
| | | North | 0 | | Off | 1600-1715 | 1800-1915 | 2000-2115 |
| | | South | 0 | | Off | 1600-1715 | 1800-1915 | 2000-2115 |
| | | East | 0 | | Off | 1600-1715 | 1800-1915 | 2000-2115 |
| | | West | 0 | | Off | 1600-1715 | 1800-1915 | 2000-2115 |

[ BACK ] [ REFRESH ]

- Home
- Customers Overview
- Operating Sites Overview
- Keyword Search
- Login User Management
- Logout Personal Profile Modify Profile Alert Status Example of Web based application -- Light Scheduling tools and controller Set up (tolerance values and site reference data a shown)

Example of Web based application – Diagnostic Tools

Test & Diagnostics Section

MCD Lighting Controller On/Off Setting

North-face [Off]    South-face [Off]
East-face [Off]    West-face [Off]

[Update Controller Unit]    [Query Controller Unit]

Retrieve Last 48 Hours Data

Face: [North]

[Query Controller Unit]    [View Last 48 Hours Data Report]

Retrieve Data for Last Turn-on Cycle

[Query Controller Unit]    [View Last Turn-on Cycle Data Report]

Retrieve Data For Last 30-days Turn-on Cycle

Select Faces (up to 2 faces per query):
☐ North    ☐ South    ☐ East    ☐ West

[Query Controller Unit]    [View Uptime Report]

Powered by Commitiva Technology ©

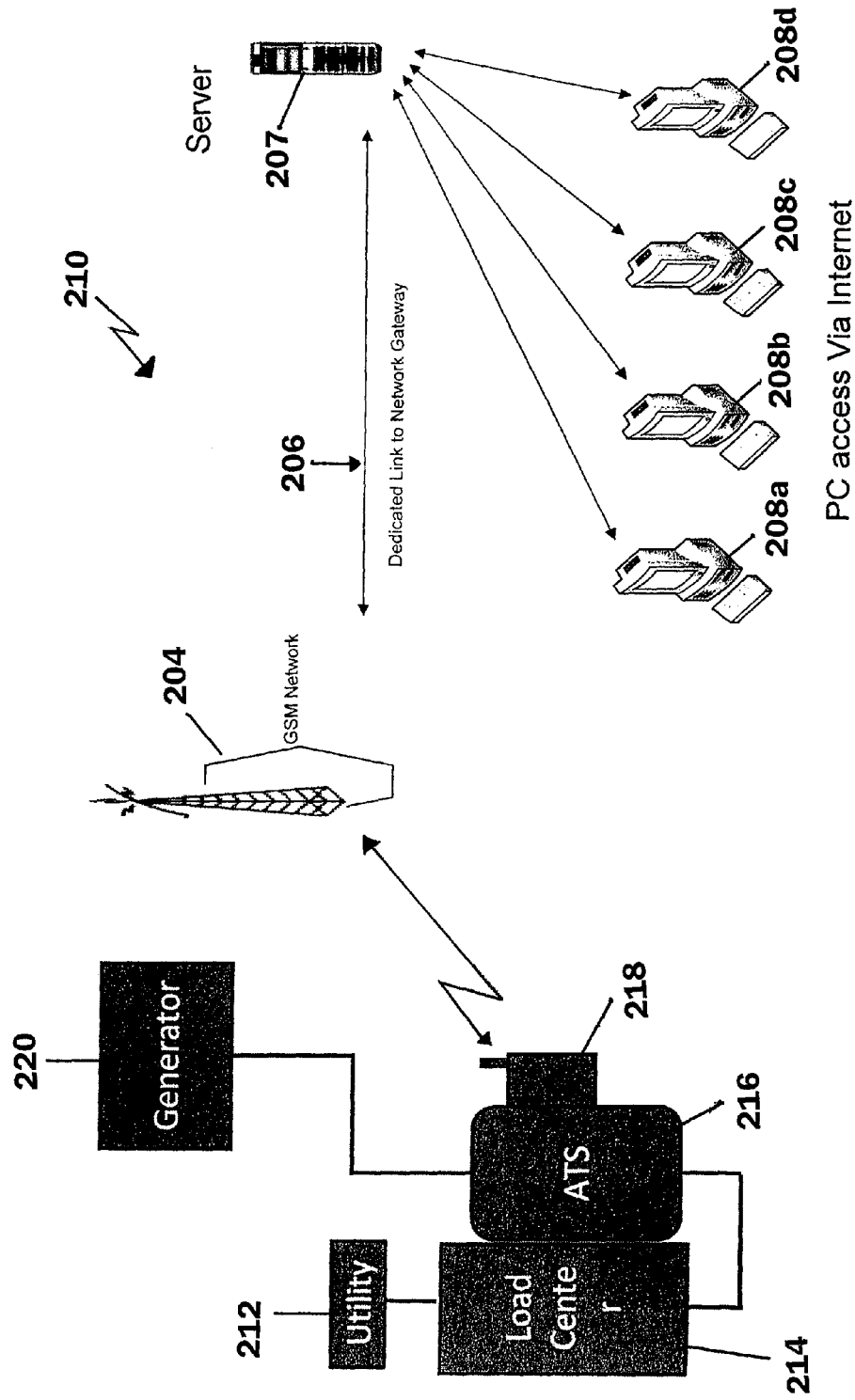

FIG. 17

Fault condition Table - Generator

| | SUMP | Utility L1 | Utility L2 | Load L1 | Generator L1 | Status | Notes for ASCO 165 ATS |
|---|---|---|---|---|---|---|---|
| 252 { | N/A | 1 | 1 | 1 | 0 | Normal operation | |
| | N/A | 0 | 0 | 0 | 0 | Utility failure | Gen should start up in 3 seconds |
| | N/A | 0 | 0 | 0 | 0 | if 2 min after utility failure then Gen failure | Gen did not start |
| | N/A | 0 | 0 | 0 | 1 | Gen start | |
| | N/A | 0 | 0 | 0 | 1 | if 2 min after Gen start then ATS failure | ATS shoud transfer load afer 20 seconds |
| | N/A | 1 | 1 | 1 | 1 | ATS switch to emergency | |
| | N/A | 1 | 1 | 1 | 1 | Utility restored | ATS will wait 5 minutes before laod transfer |
| | N/A | 1 | 1 | 1 | 0 | ATS switch to utility Gen stop | ATS will stop gen 1 minute after load transfer |
| 254 { | N/A | 1 | 1 | 1 | 0 | Normal operation | |
| | N/A | 1 | 1 | 1 | 1 | Generator exercise | ATS wil test run the Gen for 20 minutes |
| | N/A | 1 | 1 | 1 | 0 | Generator exercise complete | |
| 256 { | N/A | 1 | 1 | 1 | 0 | Normal operation | ← 250 |
| | N/A | 1 | 0 | 1 | 0 | Utility L2 failure | |
| | N/A | 1 | 0 | 0 | 0 | if 2 min after utility failure then Gen failure | |
| | N/A | 1 | 0 | 0 | 1 | Gen start | |
| | N/A | 1 | 0 | 0 | 1 | ATS switch to emergency* | |
| | N/A | 1 | 1 | 1 | 1 | Utility L2 restored | |
| | N/A | 1 | 1 | 1 | 0 | ATS switch to Utility Gen stop | |
| 258 { | N/A | 1 | 1 | 1 | 0 | Normal Operation | |
| | N/A | 0 | 1 | 0 | 0 | Utility L1 failure | |
| | N/A | 0 | 1 | 0 | 0 | if 2 min after utility failure then Gen failure | |
| | N/A | 0 | 1 | 0 | 1 | Gen start | |
| | N/A | 0 | 1 | 0 | 1 | if 5min after Gen start then ATS failure | |
| | N/A | 1 | 1 | 1 | 1 | ATS switch to emergency | |
| | N/A | 1 | 1 | 1 | 1 | Utility L1 restored | |
| | N/A | 1 | 1 | 1 | 0 | ATS switch to utility Gen stop | |
| 260 { | N/A | 1 | 1 | 0 | 0 | ATS in default | |

Controller generated alerts

| | | | | | | | |
|---|---|---|---|---|---|---|---|
| | | | | | | Loss of power to controller | normal if controller connected to 120V Load controller battery low |
| | | | | | | Low battery | |
| | 1 | | | | | Sump failure | independent of ATS - normall closed switch |
| | 0 | | | | | Sump normal | open indicates sump failure |

Controller Battery low

Sump Pump

FIG. 29

REMOTE MONITOR/CONTROL FOR BILLBOARD LIGHTING OR STANDBY POWER SYSTEM

FIELD OF THE INVENTION

This invention relates generally to the remote monitoring/control of an operating system, and is particularly directed to an arrangement for the monitor/control of remote billboard lighting or standby electrical power systems.

BACKGROUND OF THE INVENTION

Display signs are used in a wide variety of industries, and are frequently used in the promotion and advertising of products and services. Some of these display signs are used indoors, while others are used in an outdoor environment. One popular outdoor display sign is the billboard, which is typically located in populous or high-traveled areas, such as, for example, along roadsides or on the exterior of buildings. The traditional billboard is a "static" type of display sign in that the advertising image is permanently or semi-permanently affixed to the boards as paint or paper applied in the form of the message to be conveyed. In order to provide 24-hour viewing of the billboard display, an array of lights is typically attached to the billboard's frame and disposed adjacent the displayed message for viewing at night. In some cases, when using a somewhat transparent or translucent sheet, backlighting may also be employed.

More recently, "dynamic" billboards such as electronic billboards have been employed for purveying information to large numbers of people. The dynamic nature of these electronic billboards allows the displayed information to be changed electronically, or otherwise. In both types of outdoor billboards, static and dynamic, it is the use of lights which provides a 24-hour-a-day viewing capability of the displayed message. Thus, the loss of one or more lights of either of these types of displays renders it more difficult, and perhaps even impossible, to discern the displayed message. A billboard lighting failure thus reduces billboard effectiveness in carrying out its intended purpose. Because of the remote location of many billboards, this type of failure may go undetected for an extended period before it is corrected.

The present invention addresses the aforementioned limitations of the prior art by providing a billboard lighting monitor/control system which uses SMS messages over a wireless network to remotely monitor multiple points in the system including utility power and lighting system component status, and provides failure alerts as well as the capability to remotely control various lighting system operating parameters. The present invention is also adapted for remotely monitoring the status of and exercising control over the operation of an electric power backup system.

SUMMARY OF THE INVENTION

Accordingly, it is an object of the present invention to provide continuous monitoring of and precise control over the operation of a remote operating system via a wireless RF network and/or the Internet.

It is another object of the present invention to provide a monitor/control system for a remote billboard lighting network which affords flexible and easily-changed lighting schedules, customized lighting schedules to accommodate seasonal changes as well as daylight savings time, utility power and individual bulb and ballast monitoring, battery backup in the event of utility power outage, and customized operation based upon lighting system historical performance data.

A further object of the present invention is to provide improved performance and predictability for a remote billboard lighting system by recording historical performance data and establishing component tolerance levels to adjust for normal variances in current due to seasonal changes and/or aging of lamps and ballasts for reducing false alerts and increasing billboard lighting system reliability.

A still further object of the present invention is to remotely set multiple on/off times for billboard lights to turn on the lights during peak public viewing periods and to turn off the lights during low traffic periods to reduce energy costs and extend bulb lifetime.

Yet another object of the present invention is to format SMS messages transmitted over a cellular telephone network in a manner which increases information transmission efficiency and reduces communication costs.

Still another object of the present invention is to provide for an operating system a power backup monitoring and control arrangement capable of detecting the status of utility voltage, the status of the operating system including its load and standby generator, and a failure of its automatic transfer switch for switching from utility to backup power, and back.

Another object of the present invention is to determine operational status and detect specific types of failures in a backup electric power supply system by monitoring multiple points in the system, i.e., utility, load and standby generator, and communicate failures via e-mail and/or a wireless network to a system operator.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 12 is a video display presentation for providing remote monitor/control system alerts to an operator of the remote monitor/control system;

FIG. 13 is a video display presentation for providing an operator of the remote monitor/control system with controller status information;

FIG. 14 is a video display presentation for use in controlling light scheduling and controller setup and operation in the remote monitor/control system of the present invention;

FIG. 15 is a video display presentation for use by a remote monitor/control system operator for accessing system diagnostic tools;

FIG. 16 is a simplified combined schematic and block diagram of a remote backup power monitor/control system in accordance with another embodiment of the present invention;

FIG. 17 is a fault condition table presented on a video display to an operator of the remote backup power monitor/control system to assist in trouble shooting the system;

FIGS. 28-31 illustrate various screens on a video display used in assigning (or adding) usage by a customer of billboard faces or unassigning (or deleting) a customer from billboard faces currently being used by that customer.

DETAILED DESCRIPTION OF THE PREFERRED EMBODIMENTS

Figure 1:
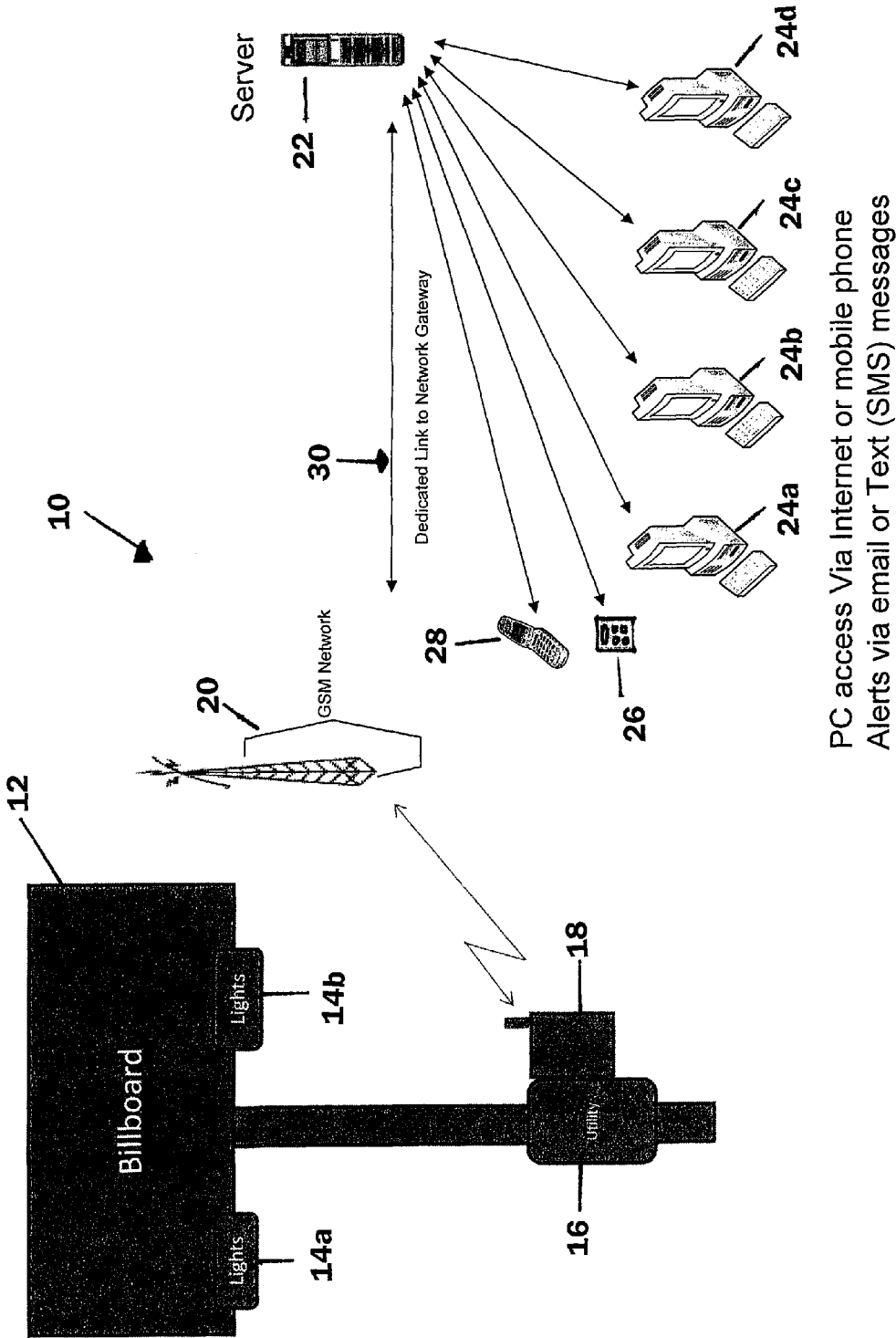
FIG. 1 is a simplified block and schematic diagram of a remote monitor/control system for billboard lighting in accordance with the present invention.

Referring to FIG. 1, there is shown a simplified block and schematic diagram of a remote monitor/control system 10 for use with billboard lighting in accordance with one embodiment of the present invention. Remote monitor/control system 10 is adapted for use with a billboard 12 having a first set of lights 14a on one side and a second set of lights 14b on the second, opposed side of the billboard. A utility power connection 16 provides electric power to lights 14a and 14b. Lights 14a and 14b illuminate opposed sides of billboard 12 upon which are displayed messages in graphic form. However, a billboard 12 used in the present invention may have any number of faces with each face illuminated by virtually any number of lights. The system described herein is designed to accommodate as many as four (4) faces in the billboard illuminated by as many as twenty-four (24) lights.

Also connected to lights 14a and 14b is a remote monitor/controller 18 which monitors and controls the operation of the billboard lights. Remote monitor/controller 18 is in communication with a GSM system for mobile communication (GSM) network 20. Remote monitor/controller 18 transmits RF signals containing information relating to the status and operation of lights 14a and 14b to a wireless GSM network 20. Remote monitor/controller 18 similarly receives RF control signals from GSM network 20 for controlling the operation of lights 14a and 14b. GSM network 20 is connected by means of a bi-directional dedicated link 30 to a server 22 in a worldwide communications network such as the Internet. Also connected to server 22 via the Internet are plural personal computers (PCs) 24a-24d. By means of PCs 24a-24d, input control signals may be provided via the Internet and GSM network 20 to lights 14a and 14b. While four PCs 24a-24d are shown in the remote monitor/control system 10 illustrated in FIG. 1, the present invention is not limited to this number of PCs for exercising system control, and may have more or less PCs. Also shown in FIG. 1 as connected to server 22 via the Internet are a handheld device 26 and a cell phone 28, either of which may also be used to monitor the operation of lights 14a, 14b and to remotely exercise control over the operation of the billboard lights.

Figure 2:
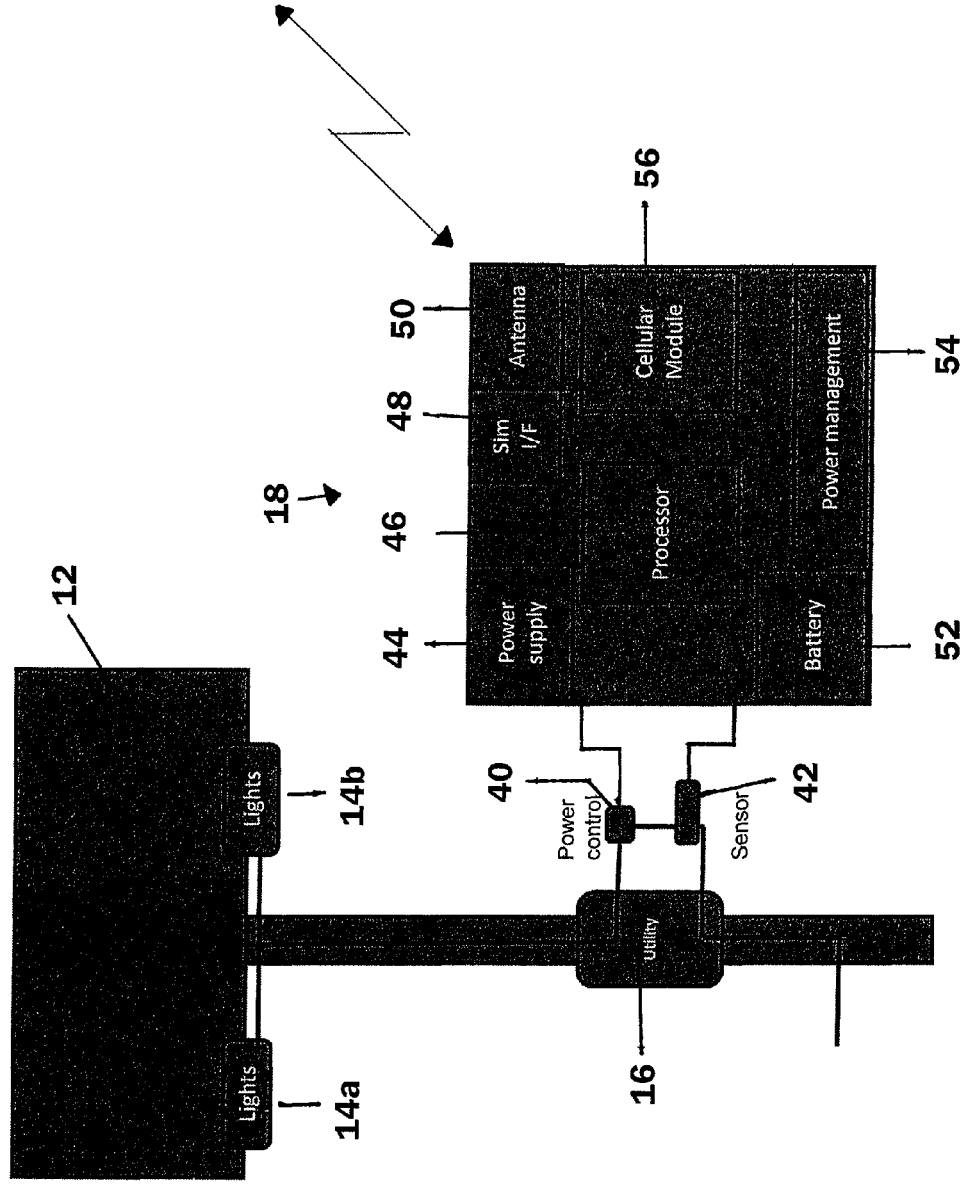
FIG. 2 is a simplified block diagram of a remote monitor/controller connected to a billboard for controlling the billboard's lights in accordance with the present invention.

Referring to FIG. 2, there are shown additional details of remote monitor/controller 18 for monitoring and controlling the operation of lights 14a and 14b. Remote monitor/controller 18 is preferably co-located with billboard 12 and is coupled to a utility power connection 16, by means of which electric power energizes lights 14a, 14b. Remote monitor/controller 18 is connected to the utility power connection 16 by means of a power control interface circuit 40 and a sensor input interface circuit 42 which are described in detail below in terms of FIG. 3.

Remote monitor/controller 18 has its own power supply 44 energized by utility power via the utility power connection 16. Remote monitor/controller 18 further includes a backup battery 52 for energizing the remote monitor/controller in the absence of utility power. The output of power supply 44 and/or battery 52 is controlled by a power management unit 54 within the remote monitor/controller 18. A cellular module 56 is imbedded in the remote monitor/controller 18 for interfacing with the aforementioned GSM network 20. Antenna 50 receives RF signals from GSM network 20 and transmits RF signals to the GSM network. Remote monitor/controller 18 further includes a SIM interface circuit 48 to allow the present system to operate with a cellular network SIM card which provides the unique identity (such as a phone number) for each device on the network so that it can be identified on the cellular network.

Figure 3:
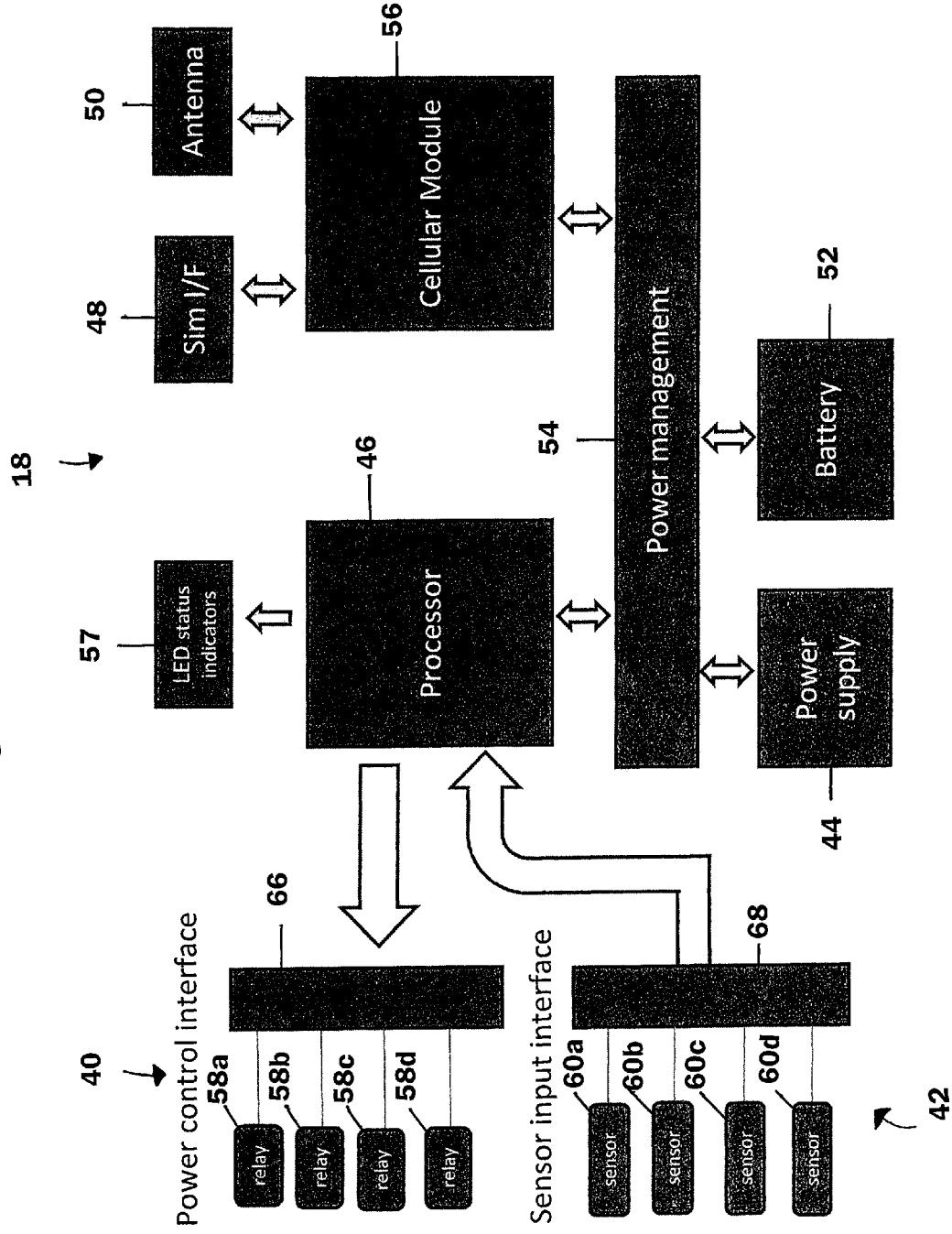
FIG. 3 is a simplified block diagram of the remote monitor/controller shown in FIG. 2.
Figure 4:
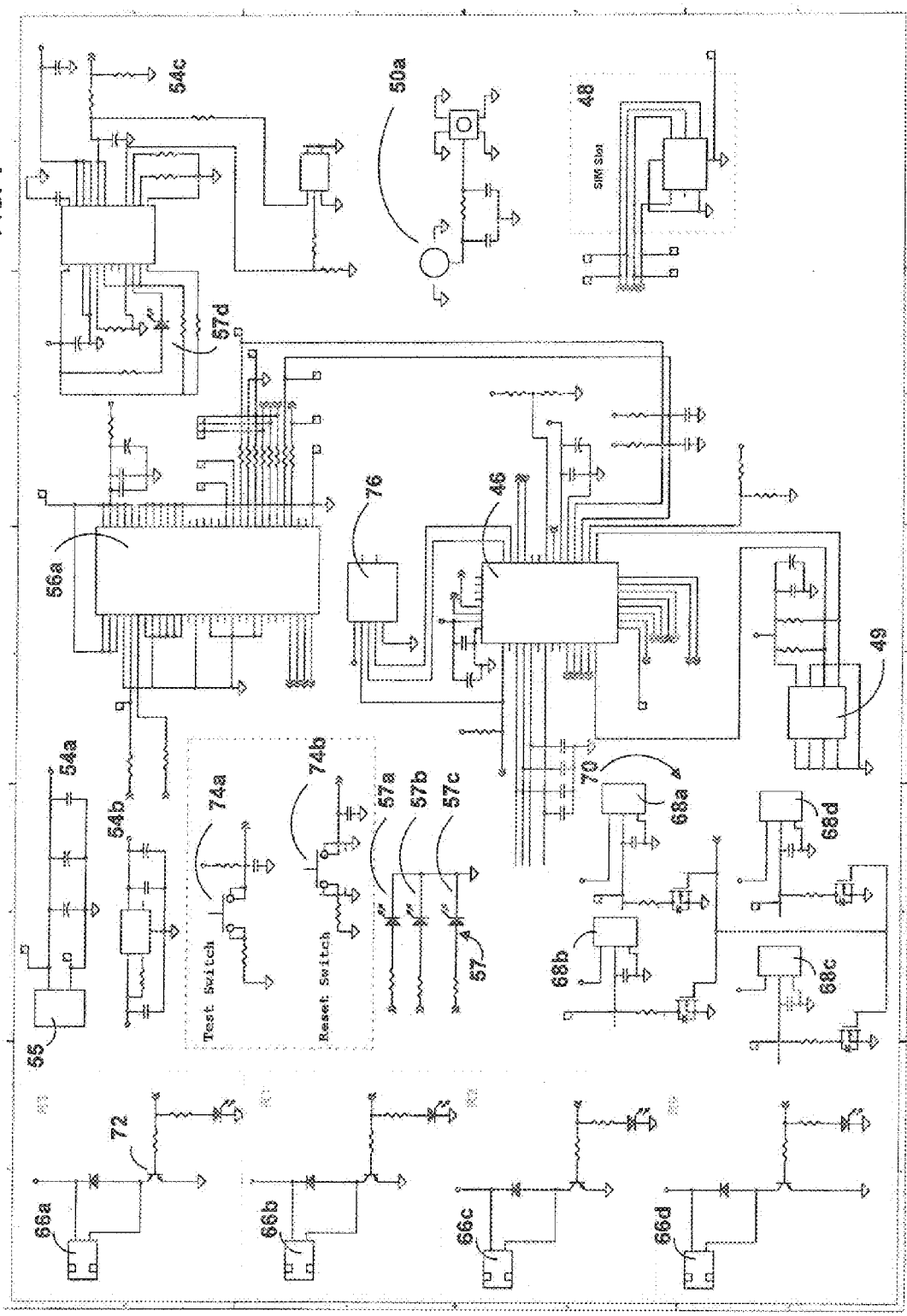
FIG. 4 is a detailed schematic diagram of the remote monitor/controller shown in FIG. 3.

Referring to FIGS. 3 and 4, there are respectively shown a block diagram and a schematic diagram of the remote monitor/controller 18 used in the present invention. Operation of remote monitor/controller 18 is under the control of processor 46 which is conventional in design and operation, but is uniquely programmed as described in detail below. Processor 46 is in the form of an integrated circuit comprising a ROM, a RAM, a controller, an arithmetic logic unit (ALU), and a clock generator on a single semiconductor chip. These components of processor 46 are not illustrated in the figures for simplicity as they are standard in this type of signal processor. Processor 46 receives various inputs from sensors 60a-60d via sensor input interface circuit 42 and provides various outputs to lights 14a and 14b via a power control interface circuit 40. Processor 46 is also connected to a power management unit 54 and is responsive to inputs from the power management unit. Power management unit 54 is comprised of a group of circuits which work together to control power in the device. Power to the lights is controlled by the power control interface circuit 40 under the control of processor 46. Power supply 44 and backup battery 52 are also coupled to power management unit 54 which controls the outputs of these units and ensures that backup battery remains fully charged. Cellular module 56 is also coupled to the power management unit 54 and receives power from either power supply 44 or battery 52 via the power management unit. Cellular module 56 is further coupled to the SIM interface circuit 48 as well as to RF antenna 50. The cellular module cannot connect to the cellular network without a valid SIM card. The cellular module 56 utilizes data from the SIM card to establish the initial connection to the GSM network 20 and while transmitting information to or receiving information from the GSM network. This is a defined process under the GSM cellular standards. Messages received from GSM network 20 are initially processed by cellular module 56 and are further processed by processor 46.

Power control interface circuit 40 includes four relays 58a-58b as well as plural connectors 66 (shown in FIG. 3 as a single connector for simplicity) for connecting the remote monitor/controller 18 to utility power connection 16 for regulating the power provided to billboard lights 14a and 14b. Sensor input interface circuit 42 includes four sensors 60a-60d as well as plural sensor connectors 68 (also shown as a single connector) for connecting the combination of utility power connection 16 and remote monitor/controller 18 to the power control interface circuit 40. Sensor input interface circuit 42 allows for exercise of control by remote monitor/controller 18 of utility power provided to billboard lights 14a and 14b. The four sensors 60a-60d within sensor input interface circuit 42 monitor current in the remote monitor/control system 10 and provide data whereby remote monitor/controller 18 can determine the operational status, performance and fault conditions of lights 14a and 14b.

As shown in the detailed schematic diagram of FIG. 4, relay connector arrangement 66 within the power control interface circuit 40 includes 4 connectors 66a-66d for respectively connecting to relays 58a-58d. Each of the four relay connectors 66a-66d receives a plus 6 VDC input from the remote monitor/controllers' power supply 44. In addition, each of the four relay connectors 66a-66d receives a respective control input from processor 46. Each of these control signals from processor 46 is provided to a respective switching transistor 72 in each connector, as shown for the first relay connector 66a, for providing the appropriate output voltage via a respective one of relays 58a-58d to one of the billboard lights 14a or 14b.

Sensor connector arrangement 68 of the sensor input interface circuit 42 also includes four sensor connectors 68a-68d as shown in the FIG. 4. Each of connectors 68a-68d couples a respective one of sensors 60a-60d to processor 46 within the remote monitor/controller 18. The inputs provided by sensor input interface circuit 42 to the remote monitor/controller 18 allow the remote monitor/controller to exercise control over the billboard lights based upon their operational status, performance and fault conditions.

Additional details of power management unit 54 are shown in FIG. 4. Power management unit 54 includes a DC power connector 55 and power connector circuit 54a, a linear voltage regulator 54b, and a battery power controller 54c. The DC power connector 55 and circuit 54a is the input for the DC voltage from the external power supply 44 and provides +6 VDC to the remote/monitor controller 18. Linear voltage regulator 54b converts this 6 VDC output to +3 VDC for use by other components of the remote monitor/controller. Power management circuit 54c provides battery 52 charging and control and provides a visual indication of utility power status via LED 57d.

The sensor connector arrangement 68 includes four sensor connectors 68a-68d each having associated circuitry for energizing and receiving output signals from a respective sensor. The LED status indicators 57 include LEDs 57a, 57b and 57c for providing visual information regarding the status of remote monitor/controller 18. The SIM card circuit 48 shown in FIG. 4 enables cellular module 56 to access data from the SIM card installed in each remote monitor/controller 18. Antenna 50 is coupled to cellular module 56 in the remote monitor/controller 18 by means of an RF antenna connector 50a. Test button 74a initiates the test and calibration process during controller installation, while reset button 74b initializes remote monitor/controller 18 to clear fault conditions. Processor 46 controls the operation of remote monitor/controller 18 in accordance with operating programs stored in the processor. Connector interface 56a provides for embedding the cellular module 56 within remote monitor/controller 18. A processor connector 76 coupled to processor 46 allows for re-programming of software within remote monitor/controller 18 to add or change functionality of the remote monitor/control system 10. This capability also allows the remote monitor/controller 18 to be used not only with billboard lighting systems, but also with backup power generators systems when reconfigured. EEPROM 49 is a memory device that stores information such as controller configuration, measurement data from sensors and scheduled on/off times.

Figure 5:
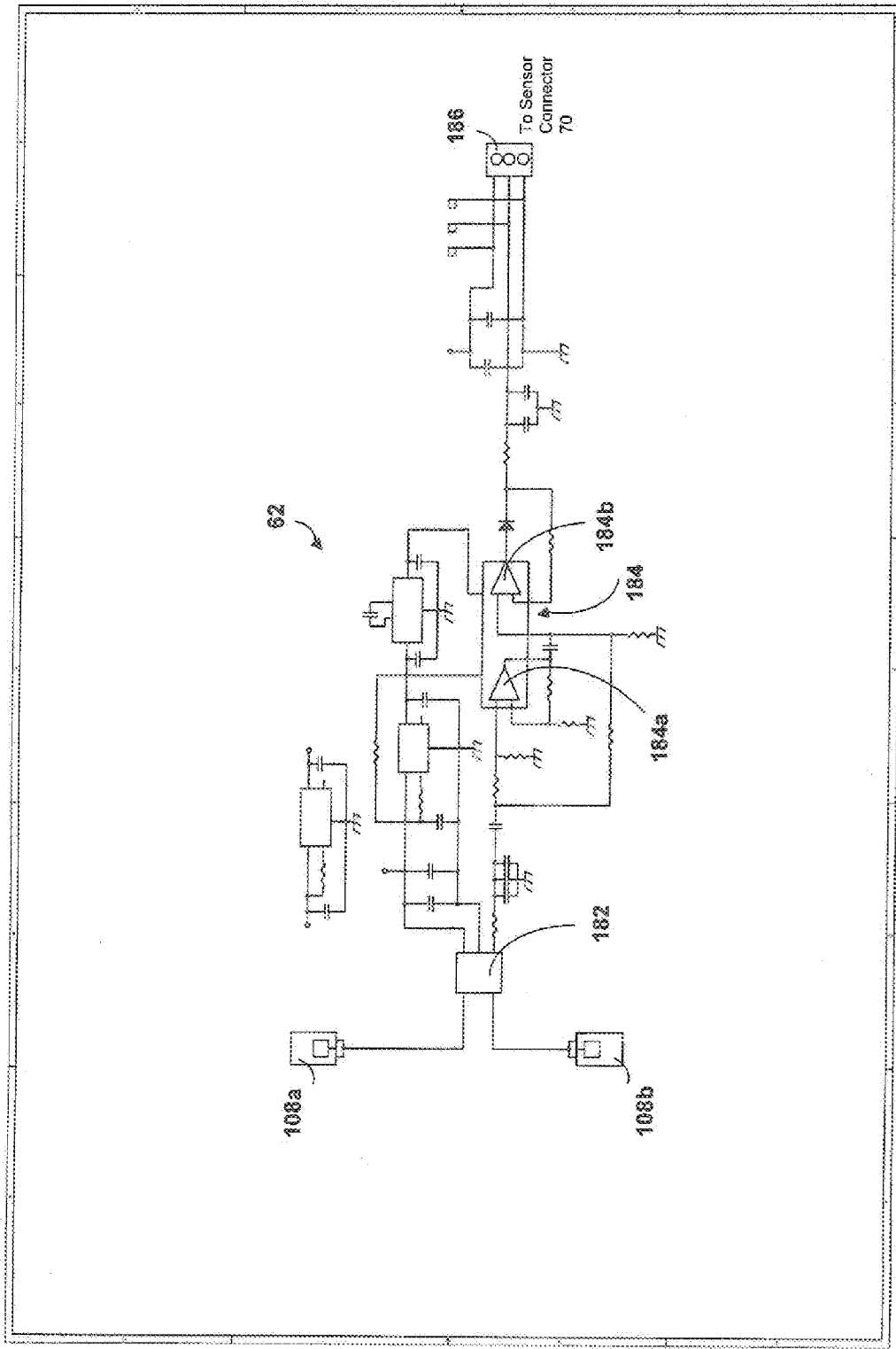
FIG. 5 is a schematic diagram of a current sensor for use in the remote monitor/control system of the present invention.

Referring to FIG. 5, there is shown a schematic diagram of a current sensor module 62 for use in the remote billboard lighting monitor/control system 10 of the present invention. Current sensor module 62 is coupled by means of first and second terminal connectors 180a and 180b to a 120 VAC source for providing the AC input current to a current level sensor circuit 182. One output of the current level sensor circuit 182 is provided to an amplifier stage 184 which includes first and second amplifiers 184a and 184b. The output of amplifier stage 184 is provided to an output connector 186. The output from connector 186 representing the level of AC current in the received input signal is provided to sensor connector 70 in the remote monitor/controller 18 as shown in FIG. 4. The output of current sensor module 62 is a voltage representing the level of the AC input current to the current sensor module.

Figure 6:
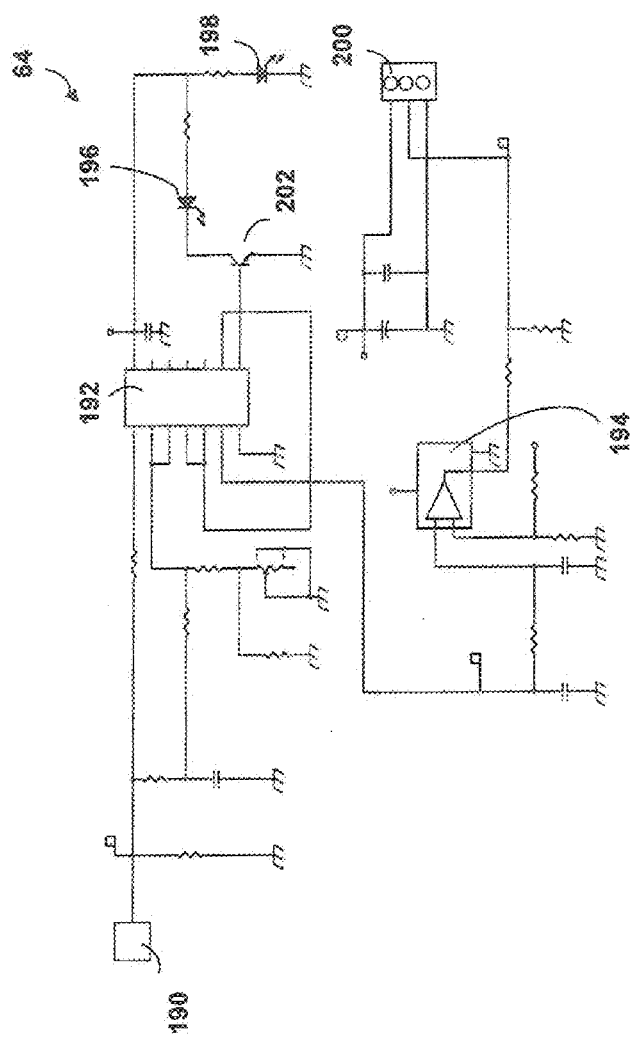
FIG. 6 is a schematic diagram of a voltage sensor for use in another embodiment of the remote monitor/control system of the present invention, such as in a remote backup power monitor/control system.
Figure 7:
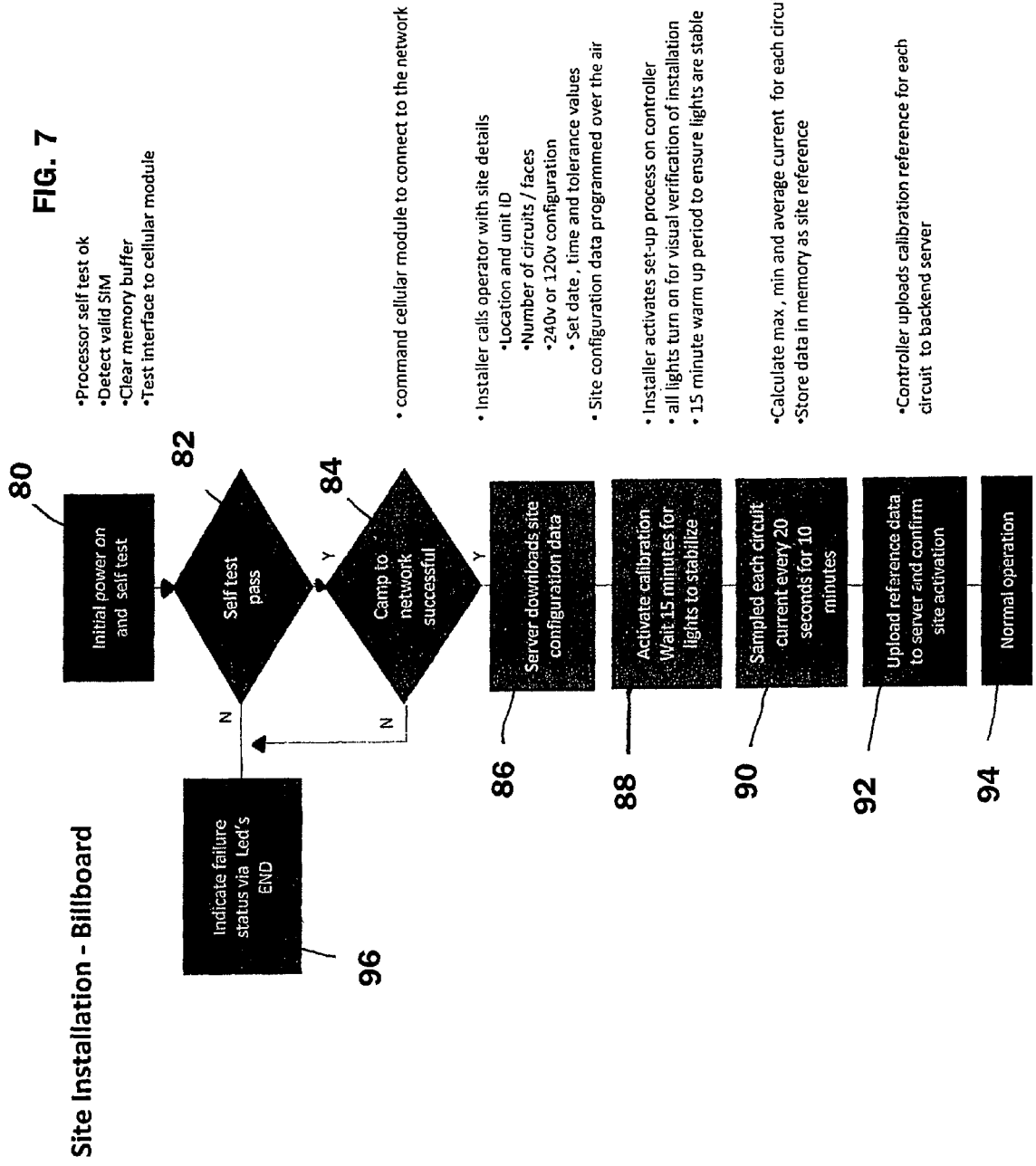
FIGS. 7, 8, 10 and 11 are flowcharts illustrating the series of steps carried out by the remote monitor/control system of the present invention.

Referring to FIG. 6, there is shown a voltage sensor module 64 for use in a remote monitor/controller for a standby electrical power system in accordance with another embodiment of the present invention described in detail below. Voltage sensor module 64 includes an inductive sensor probe 190 disposed in close proximity to a conductor to which a voltage is applied. Inductive sensor probe 190 provides a signal representing the voltage level in the adjacent conductor to a voltage sensing circuit 192. Power is provided to voltage sensing circuit 192 via connector 200. Illumination of LED 198 indicates the presence of power to sensor probe 190. An output of the voltage sensing circuit 192 is provided to LED 196 to indicate that voltage has been detected at inductive sensor 190. Voltage sensing LED 196 is also coupled to the voltage sensing circuit 192 by means of transistor 202 for providing a visual indication if the applied voltage exceeds a predetermined threshold value. A second output of voltage sensing circuit 192 is provided to an amplifier 194 where it is amplified and provided to connectors 68a-68d via connector 200 and is the input to processor 46. The input to the voltage sensor module 64 is provided via connectors 68a-68d from the DC power supply circuit 54a.

Referring FIGS. 7-11, there is shown a series of flowcharts illustrating the various operations carried out by the remote monitor/control system 10 of the present invention under the control of the system's processor 46 in accordance with programs stored in the processor. At step 80 shown in FIG. 7, initial power is applied to remote monitor/controller 18 and a self-test operation is carried out. Processor 46 undergoes a self-test routine, a valid SIM signal is searched for, a buffer memory in the processor is cleared, and the interface to the cellular module 56 is tested. The program stored in processor 46 then determines if these various tests have been passed at step 82. If any of these tests is not passed, the program proceeds to step 96 to provide an operator with a failure indication on the LED status indicators 57. If any of these status indicators illuminate, the program terminates, allowing an operator to check for the indicated problem. If at step 82, processor 46 determines that all of the self-tests have been passed, the program proceeds to step 84 for directing cellular module 56 to connect to GSM network 20 via antenna 50. If cellular module 56 is unable to connect to GSM network 20, the program proceeds to step 96 indicating a failure status on the LED status indicators 57. If at step 84 it is determined that cellular module 56 has successfully connected to GSM network 20, the program proceeds to step 86 for allowing an operator to select downloading the billboard site configuration data from server 22 to processor 46 via GSM network 20. This site configuration data includes location and unit identification of the particular billboard, the number of light circuits/faces of the billboard in question, the voltage configuration of the billboard, i.e., 120 or 240 VAC, and the set date, time and tolerance values of the billboard lighting system.

Following the downloading of billboard site configuration data by server 22, step 88 is initiated when the installer activates test switch 74a for starting the test and calibration sequence involving waiting for 15 minutes for billboard light operation to stabilize. In this step, the installer activates the set-up process on the remote monitor/controller 18 and all lights are turned on for visual identification of installation. Following the 15 minute warm-up period, the program then proceeds to step 90 where each lighting circuit is sampled for its current every 20 seconds for a period of ten minutes. This step involves the calculation of a maximum, minimum and average current for each circuit, which values are stored in the processor's memory for that particular site. The program then proceeds to step 92 for uploading reference data to the server 22 and confirming billboard site activation. In this step, the remote monitor/controller 18 uploads calibration reference data for each lighting circuit to server 22. The program then proceeds to step 94 for initiating normal operation of the remote monitor/controller 18.

Figure 8:
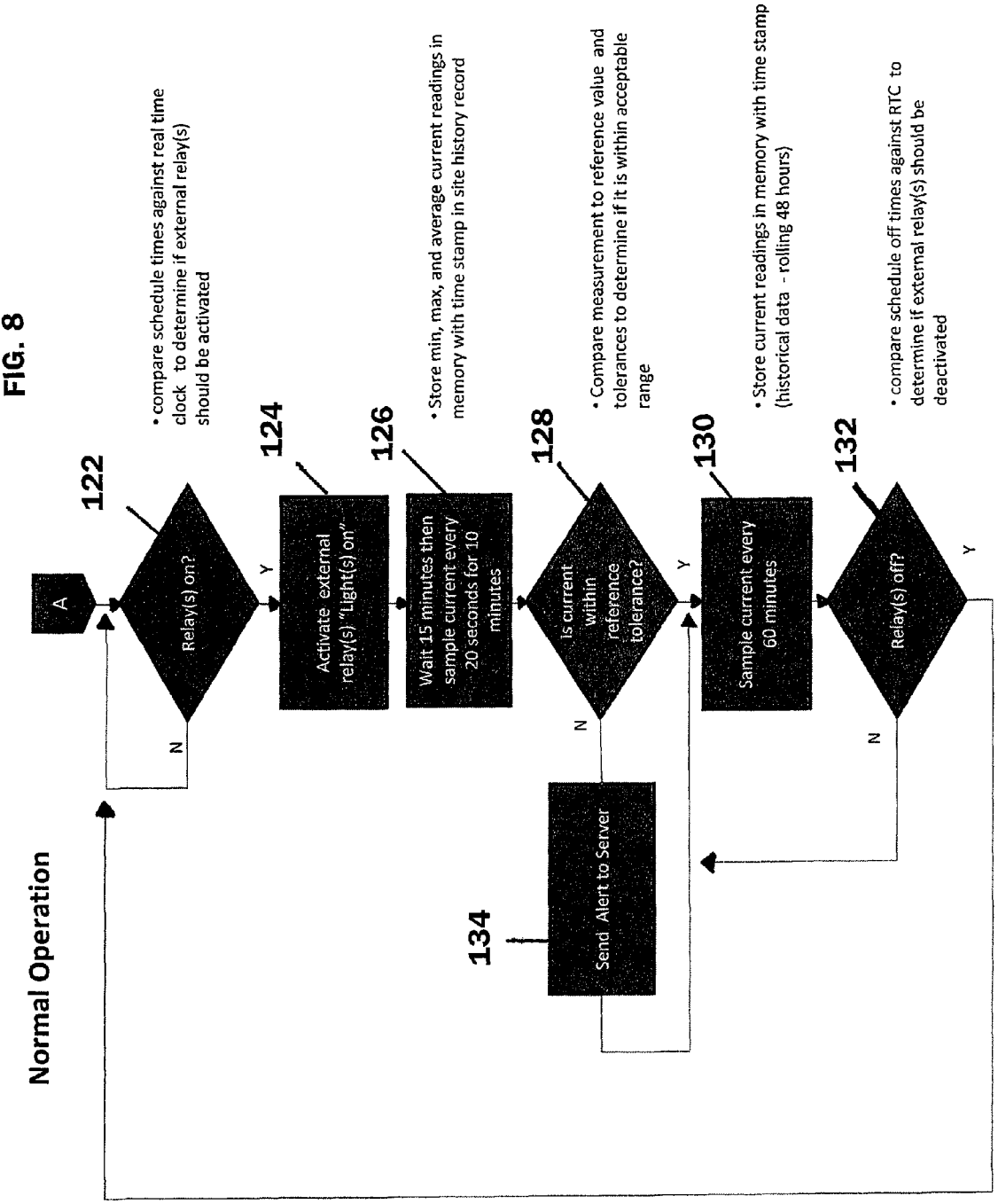

Normal operation of the remote monitor/controller 18 is initiated as shown in FIG. 8 at step 122 where a comparison is made between the scheduled times of operation of the billboard lights with a real time clock information to determine if external relays 58a-58d should be activated. If it is determined at step 122 that the external relays 58a-58d should not yet be activated, the program enters a closed cycle until it is determined that an external relay should be activated, whereupon the program proceeds to step 124 for activating one or more of the external relays for causing the billboard lights to turn on. The program then proceeds to step 126 for initiating a waiting period of 15 minutes to ensure stable light operation, and then samples the light current every 20 seconds for ten minutes. The program measures and stores minimum, maximum and average current readings in memory with a time stamp to establish a site history record for that particular billboard site. This site history record is used to determine a reference tolerance curve for each set of lights at each billboard site as described below with reference to FIG. 8a. The program then proceeds to step 128 to determine if the current is within an acceptable range as defined by the reference tolerance previously determined. If it is determined that the current is not within the reference tolerance, the program generates a message on the server 22 that is seen by a customer using a PC such as one of 24a-24d to access the monitoring software, or a handheld device or mobile phone. The alert can also be sent via text message to mobile phones or email to specific email accounts specified by the customer. If at step 128 it is determined that the current is within the predetermined reference tolerance value, the program proceeds to step 130 and samples the current every 60 minutes. These sampled current readings are stored in memory with a time stamp to establish a rolling compilation of historical operating data over 48 hour periods. The program then proceeds to step 132 to determine if an external relay should be deactivated in accordance with scheduled off times with reference to real time clock. If at step 132 it is determined that a relay should not be deactivated, the program returns to step 130 and continues to sample light current every 60 minutes. If at step 132 it is determined that a relay should be deactivated, the program deactivates the relay and returns to step 122 to await the next scheduled activation time of the relay.

Figure 9:
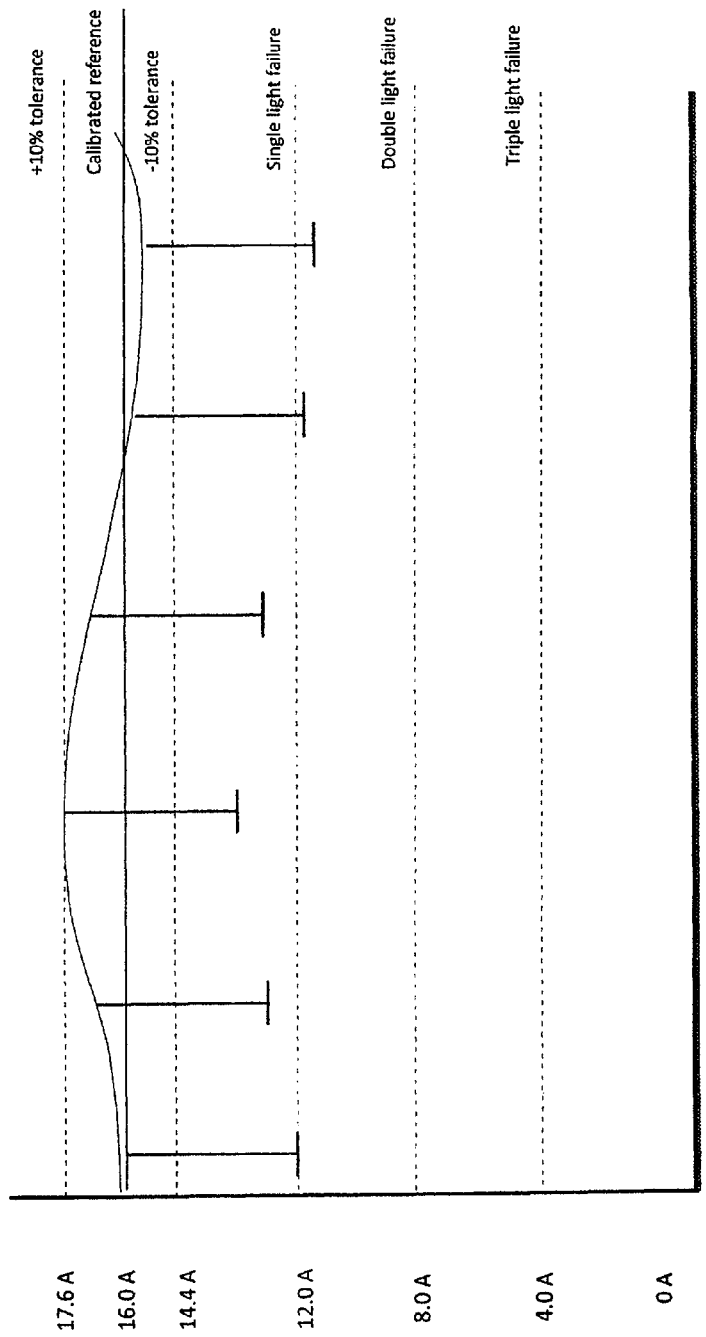
FIG. 9 is a reference tolerance curve for a four light circuit for use in analyzing circuit performance in accordance with one aspect of the present invention.

Referring to FIG. 9, there is shown an example of a reference tolerance curve for use in a four light circuit for use in analyzing circuit performance. The sinusoidal waveform represents normal current variation over time in the four light circuit. A +10% and −10% tolerance range is established for variation in circuit current during normal lighting operation. Thus, for a nominal operating current of 16.0 amps, an upper +10% tolerance of 17.6 amps and a lower −10% tolerance of 14.4 amps defines the acceptable range of circuit current during normal operation. In the event of a single light failure, the variation in reduced circuit current is shown by the lower projections of the normal sinusoidal operation curve. A similar variation in circuit current can be determined for double and triple light failures from the circuit current operating curve shown in FIG. 9. By using these reference tolerance ranges, it can easily be determined if the lighting circuit is operating normally or if any of the lights have failed, as well as the number of failed lights. The tolerance levels can be updated on the controller remotely in 1% increments to optimize the performance of any specific site taking into consideration the historical performance of the site, the number and type of lamps and fixtures on the site, and the geographical location to account for sites in extreme temperature environments. For example, a site in Florida may have very different performance compared to a similar site in Alaska. This provides for a high level of fault tolerance, reducing the possibility of false alerts. The historical performance is compiled from the daily current measurements that are uploaded to the server and provide daily monthly, and yearly performance in graphical format.

Figure 10:
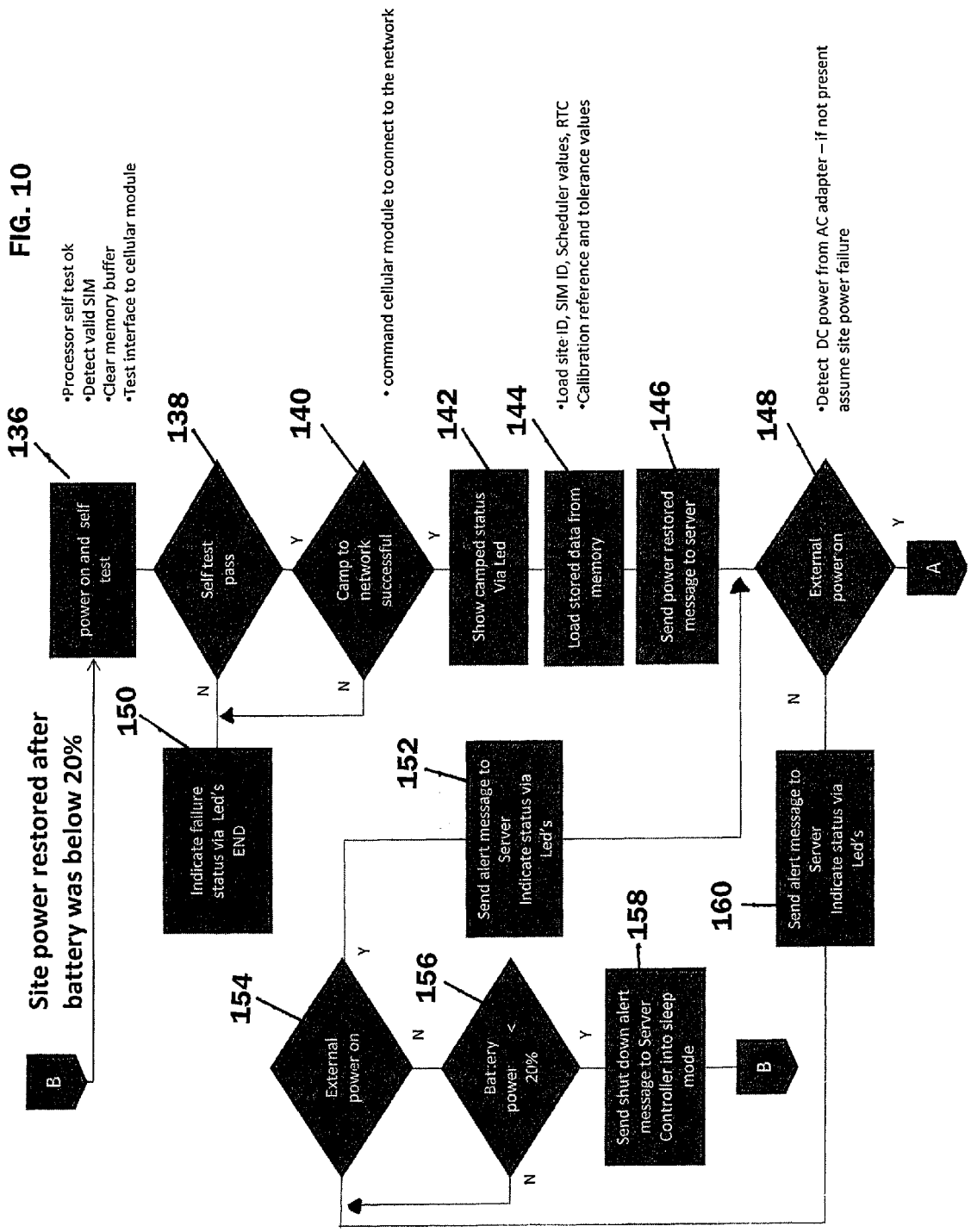

Referring to FIG. 10, there is shown the series of steps carried out by processor 46 where utility power has failed and has not been restored prior to backup battery power discharging to below 20% of normal operating power. In this case, processor 46 will shut down to conserve battery power and will reactivate when utility power is restored. At step 136, the program executes a remote monitor/controller self-test routine including the processor checking that the cellular module has detected a valid SIM card, clearing the processor's memory buffer, and testing the interface to the cellular module 56. The program then at step 138 determines if the self-test was passed, and if so, proceeds to step 140 for directing cellular module 56 to connect to GSM network 20. If at step 138 it is determined that the processor self-test was not passed, the program proceeds to step 150 to provide a visual indication of input power failure on LED status indicator 57 and the program terminates. If at step 140 it is determined that cellular module 56 is unable to connect to GSM network 20, the program also branches to step 150 to indicate the failure of a connection to the GSM network on the LED status indicators 57 and the program terminates. If at step 140, communication between cellular module 56 and GSM network 20 is established, the program proceeds to step 142 to provide a visual indication of this communications link on LED status indicators 57. The program then proceeds at step 144 to load data previously stored in EEPROM memory 49 into the remote processor's memory. This data includes lighting load site identification, SIM identification, operating scheduler values, and RTC information. Also retrieved from memory and loaded is calibration reference and tolerance values for the particular billboard lighting system being addressed. The program then proceeds to step 146 and sends a power restore message to server 22. The program then at step 148 checks utility power to ensure that utility power is still present (did not recover and fail again) and if utility power is still present, the program proceeds to the normal operation sequence illustrated in FIG. 8 and discussed above. If at step 148 it is determined that external power has not been restored, a program at step 160 sends an alert message to server 22 and provides a visual indication of the lack of external power on LED status indicators 57. The program then proceeds to step 154 to enable the controller to monitor battery status while utility power is not present to enable the unit to shut down if battery power goes below 20% and no utility power is present. This process ensures that there is sufficient battery power present for the controller to send out an alert for warning the operator that the site is shutdown. If utility power recovers before battery power is at 20% of normal utility power level, remote monitor/controller 18 will advise that utility power is restored and will continue with normal operation which would include the battery being recharged. At step 152, the program sends an alert message to server 22 and provides a visual indication of the restoration of utility power on LED status indicators 57. The program then proceeds to step 148 and exits the site external power restoration routine of FIG. 10. If at step 154 external power is not detected, the program proceeds to step 156 to determine if backup battery power is less than 20% of normal input power. If battery power is not less than 20% of normal input power, the program returns to step 154 and continues to monitor for the restoration of external power. If at step 156 it is determined that backup battery power is less than 20% of normal operating power, the program proceeds to step 158 and sends a shutdown alert message to server 22 causing a remote monitor/controller 18 to enter a sleep mode, followed by a return to the beginning of the site external power restoration routine of FIG. 10.

Figure 11:
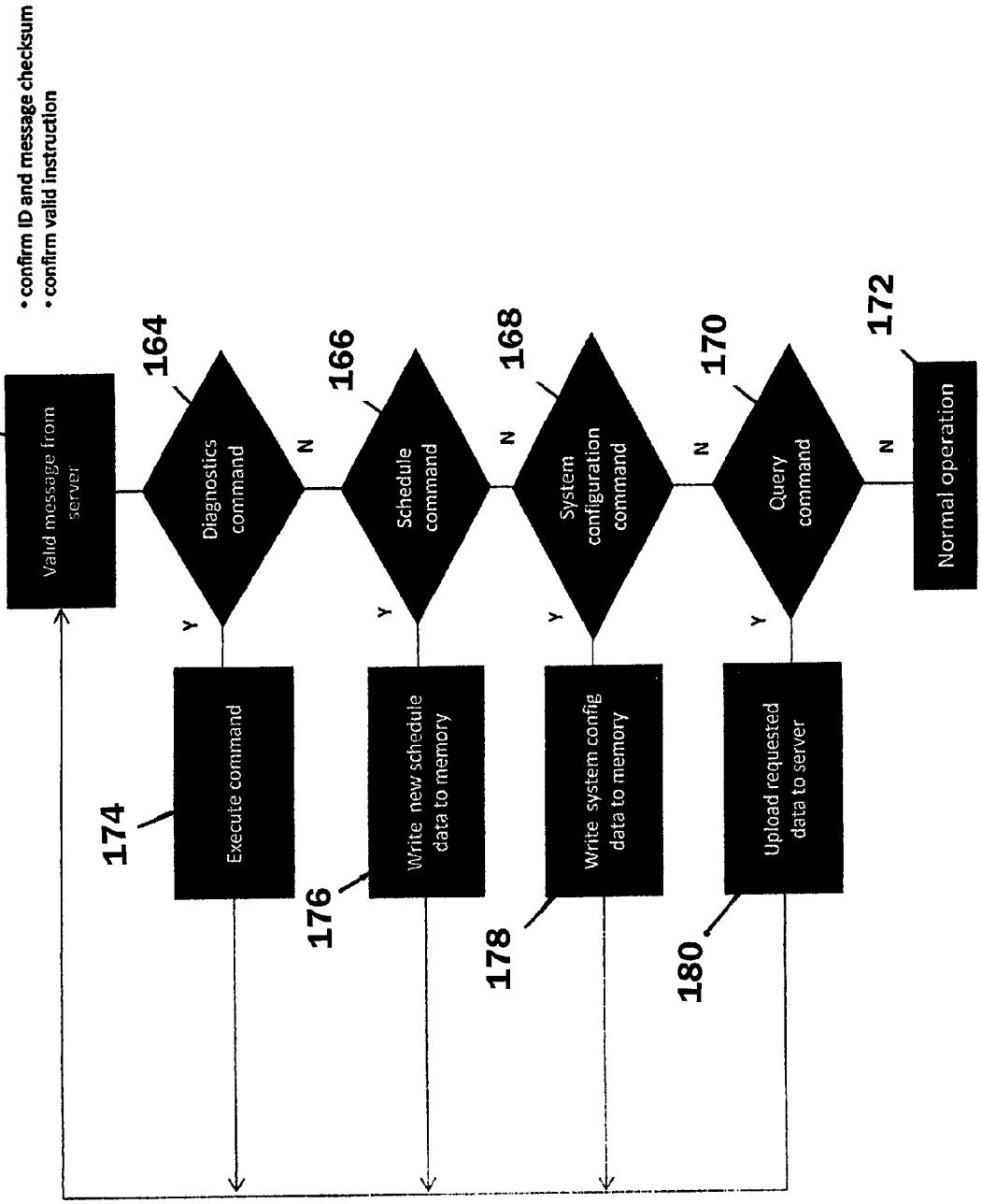

Referring to FIG. 11, there is shown the series of steps carried out by the program stored in processor 46 for detecting an incoming command message to remote monitor/controller 18 from server 22. At step 162, a valid message is provided to remote monitor/controller 18 from server 22. At step 164, the program determines if the valid message is a diagnostics command and proceeds to step 174 for execution if the message is a diagnostics command. The program then returns to step 162 and again waits receipt of a valid message from server 22. If at step 164, it is determined that the valid message is not a diagnostics command, the program proceeds to step 166 to determine if the valid message is a lighting schedule command. If the valid message is a lighting schedule command, the program proceeds to step 176 and writes the new schedule data into memory for changing the operation of the billboard lights. The program then returns to step 162 and again awaits receipt of a valid message from server 22. If at step 166 it is determined that the valid message is not a schedule command, the program proceeds to step 168 to determine if the valid message is a system configuration command. If at step 168 it is determined that the valid message is a system configuration command, the program proceeds to step 178 for writing the new system configuration data to memory for changing the configuration of the remote monitor/control system 10. The program then returns to step 162 for again awaiting receipt of a valid message from server 22. If at step 168 it is determined that the valid message is not a system configuration command, the program proceeds to step 170 for determining if the valid message is a query command. If it is determined that the valid message is a query command, the program proceeds to step 180 for uploading the requested data to server 22 from remote monitor/controller 18 in responding to the query. The program then returns to step 162 and again monitors for receipt of a valid message from server 22. If at step 170 it is determined that the valid message is not a query command, the program proceeds to step 172 for initiating normal operation as shown in FIG. 8.

Referring to FIG. 12, there is shown an alerts overview display screen for use in monitoring and controlling the remote monitor/control system 10 of the present invention. Shown at the top of the screen are four user selectable methods for accessing data recorded and stored in the system. These methods for accessing data are by selecting (a) a customer overview mode, (b) an individual operating site overview mode, (c) a user login site mode, or (d) a keyword search mode. Below on the alert screen are summaries of alerts associated with three different customers. The first indicated alert summary relates to demonstration of the system at a first customer wherein five alerts occurred. The second alert summary relates to generator monitoring for a second customer designated L002. The third alert summary is for customer LMRT having ten billboard lighting systems, where alerts for each of the ten systems are shown. In each of these alert summaries, the total number of alerts received is illustrated, as is the number of alerts which have yet to be handled, or processed.

Referring to FIG. 13, there is shown in greater detail the controller status of the LMR customer referred to in FIG. 12. FIG. 13 includes additional identifying information regarding a specific billboard lighting site as well as detailed information regarding the history of operation of this billboard lighting system. The illustrated detailed controller status information includes detailed information regarding each of the four faces of the billboard lighting system with specific operating information including the number of the lights in each billboard space, the electric current in and present status of each individual billboard lighting system, and the operating schedule of each billboard lighting system for each of the four billboard lighting faces. As shown for the LMR site 2 in FIGS. 12 and 13, a total of 59 alerts have occurred regarding this particular billboard lighting system none of which have been tended to. When an alert is attended to, or resolved, the display of that alert is canceled on the video displays of FIGS. 12 and 13 by the system operator. Controller 18 automatically adjusts the RTC for daylight saving time based upon data stored in the controller and shown as DST 1 and DST 2.

Figure 14:
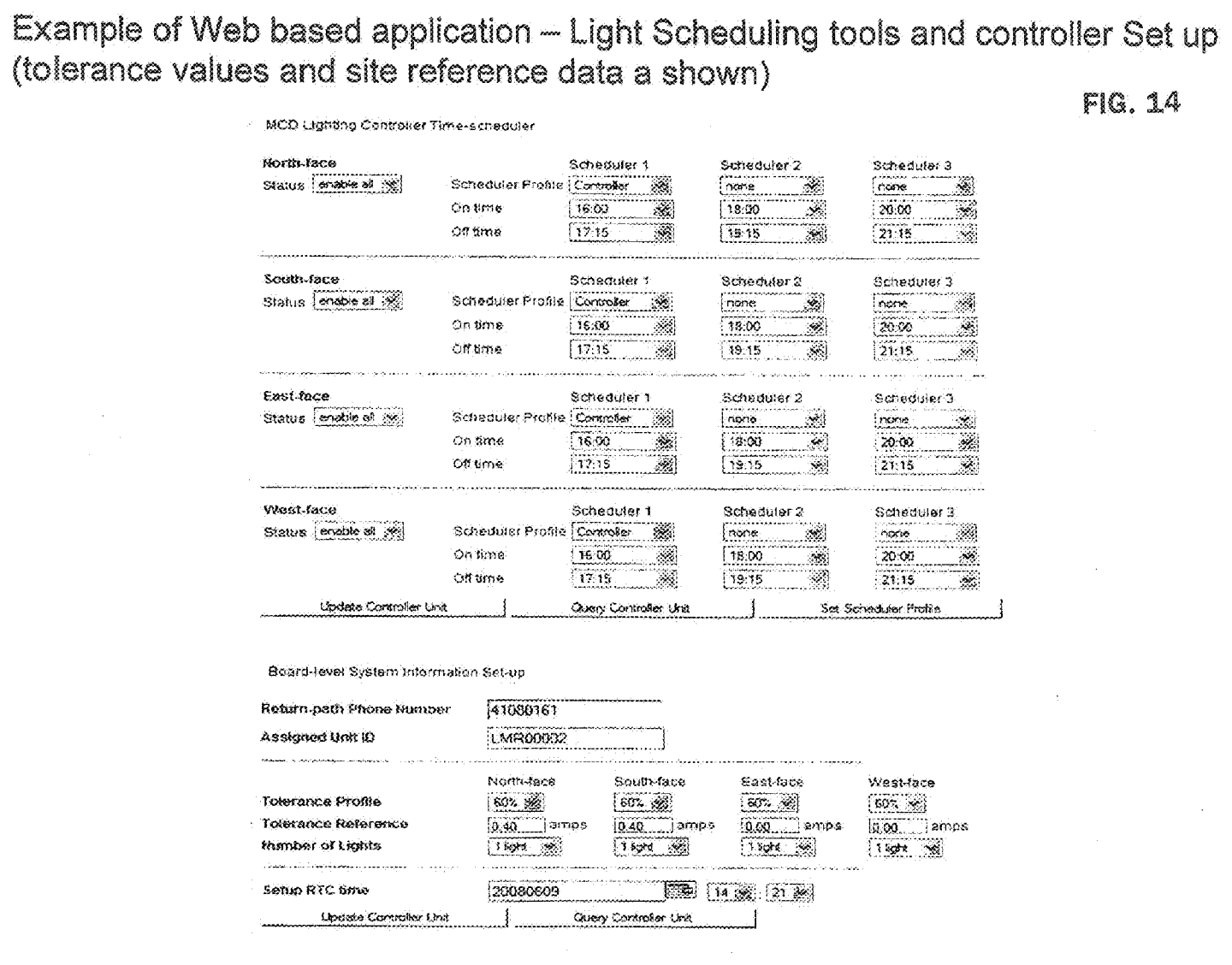

Referring to FIG. 14, there is shown a video display for use by a system operator in selecting and entering the lighting schedule of a billboard lighting system having 4 faces identified as North, South, East and West faces. Each face is capable of operating over three sets of on and off times. The individual selectors under the schedule 1, schedule 2, and schedule 3 designations allow a system operator to enter and subsequently modify the on/off schedules of each of these three billboard lighting systems. Each individual face of the billboard lighting system is enabled or disabled by means of the "Status" selector in the time-scheduler portion of the display shown in FIG. 14. The "Scheduler Profile" selector permits a standard, or common, schedule to be entered for each of the four faces of the billboard lighting system for ease of programming as also shown in FIG. 14. However, the individual selectors for each of the faces of the billboard lighting system permits the individual faces to be programmed for operation in an independent manner with different lighting schedules. Each of the billboard lighting system faces may be provided with separate and independent operating schedules.

Referring to the lower portion of FIG. 14, there is shown an arrangement for incorporating a tolerance profile in the operation of a selected billboard lighting system as discussed above. As shown in the figure, each of the four faces of the billboard lighting system is provided with a selectable Tolerance Profile of 60%. Also as shown, the North and South faces of the billboard lighting system are provided with Tolerance Reference current value of 0.40 amps. The Tolerance Profile and Tolerance Reference values are selected by means of the video display shown on the lower portion of FIG. 14 and are entered by selecting a calibration button of the remote monitor/controller 18 shown in FIG. 4. Upon entry of the Tolerance Profile and Tolerance Reference values, these values are provided to server 22 for storage and use. With a Tolerance Profile of 60% and a Tolerance Reference of 0.40 amps, an alert would be triggered in the event that the current exceeds 0.64 amps or is less than 0.16 amps for the example shown in the lower portion of FIG. 14.

The Set Up RTC Time selector on the lower portion of the video display set up arrangement shown in FIG. 14 is used to enter real time clock information in the remote monitor/control system 10. Also shown in the lower portion of FIG. 14 is the Update Controller Unit and Query Controller Unit selectors. The Update Controller selector is used to send lighting time schedule operating information illustrated in the upper portion of FIG. 14 to remote monitor/controller 18. The Query Controller Unit selector allows an operator to display the time schedule and current tolerance values for a given billboard lighting system in the video display presentation shown in FIG. 14.

Referring to FIG. 15, there is shown a video display presentation for use in accessing diagnostic tools in the remote monitor/control system 10 of the present invention. The four selectors in the MCD Lighting Controller On/Off Setting portion of the display shown in FIG. 15 allow the light in any of the four faces of the billboard lighting system to be turned on or off, as desired. This permits an operator to verify the operation of a selected function by noting the readings of the corresponding operation parameters. In the section entitled Retrieve Last 48 Hours Data portion of the display, an operator can select a desired face of the billboard lighting system and view its operating data and performance over the last 48 hours. By storing and reviewing these 48 hour data reports, long term trends of the billboard lighting system can be determined. In the portion of the display entitled Retrieve Data for Last Turn-On Cycle portion of the diagnostic tools display, a user can view billboard lighting system operating data for the last time the lighting system was turned on for comparing this previous data with current turn-on operating data. In the portion of the diagnostic tools entitled Retrieve Data For Last 30-days Turn-On Cycle the operator can obtain a current report either visually or in printed form of the operating state of a selected face of the billboard lighting system and compare the current operating state with billboard lighting system operation over the previous 30 days of operation. If this data is not requested by a system operator, the system automatically sends last 30 days operating data on the last day of each month to the system server 22. In this manner, historical operating data accumulated over the lifetime of the billboard lighting system may be reviewed and compared with current operating data for each face of each billboard lighting system under the control of the operator.

Referring to FIG. 16, there is shown a simplified block and schematic diagram of a remote backup power monitor/control system 210 in accordance with another embodiment of the present invention. Remote backup power monitor/control system 210 includes a remote portion comprised of a utility power connection 212, a load center 214, an automatic transfer switch 216, a remote monitor/controller 218 and a backup generator 220. The remote portion of the remote backup power monitor/control system 210 is in communication with a GSM network 204 which, in turn, is connected by means of a bi-directional dedicated link 206 to a server 207 in a worldwide communications network such as the Internet. Also connected to server 207 via the Internet are plural PC controllers 208a-208d. By means of a PC controllers 208a-208d, the remote portion of the remote backup power monitor/control system 210 may be controlled by one or more remotely located operators using one or more controllers. As in the previously described embodiment, the present invention is not limited to this number of PC controllers for exercising system control and may have more or less PC controllers. Also as in the previously described embodiment, remote control may be provided by operator-responsive devices other than PC controllers. For example, control may also be exercised by means of a hand-held device connected to server 207 or by means of a cellphone connected to the GSM network 204 by conventional means. Neither the hand-held device nor cellphone is illustrated in FIG. 15 for simplicity. The operation of these communications devices in the present embodiment is the same as that previously described in terms of the first embodiment described above.

Figure 16A:
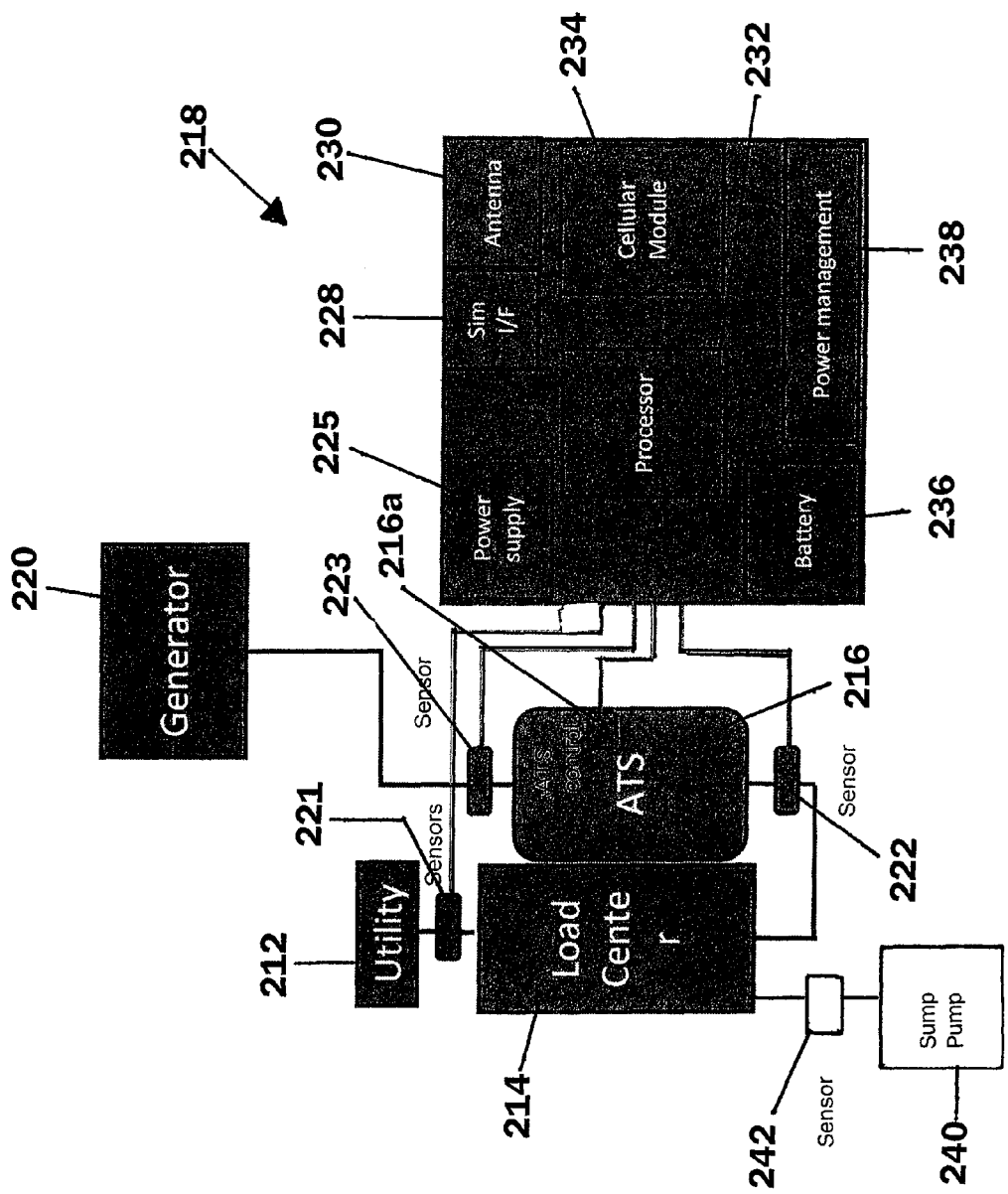
FIG. 16a is a block diagram of the remote portion of the backup power monitor/control system shown in FIG. 16.
Figure 18:
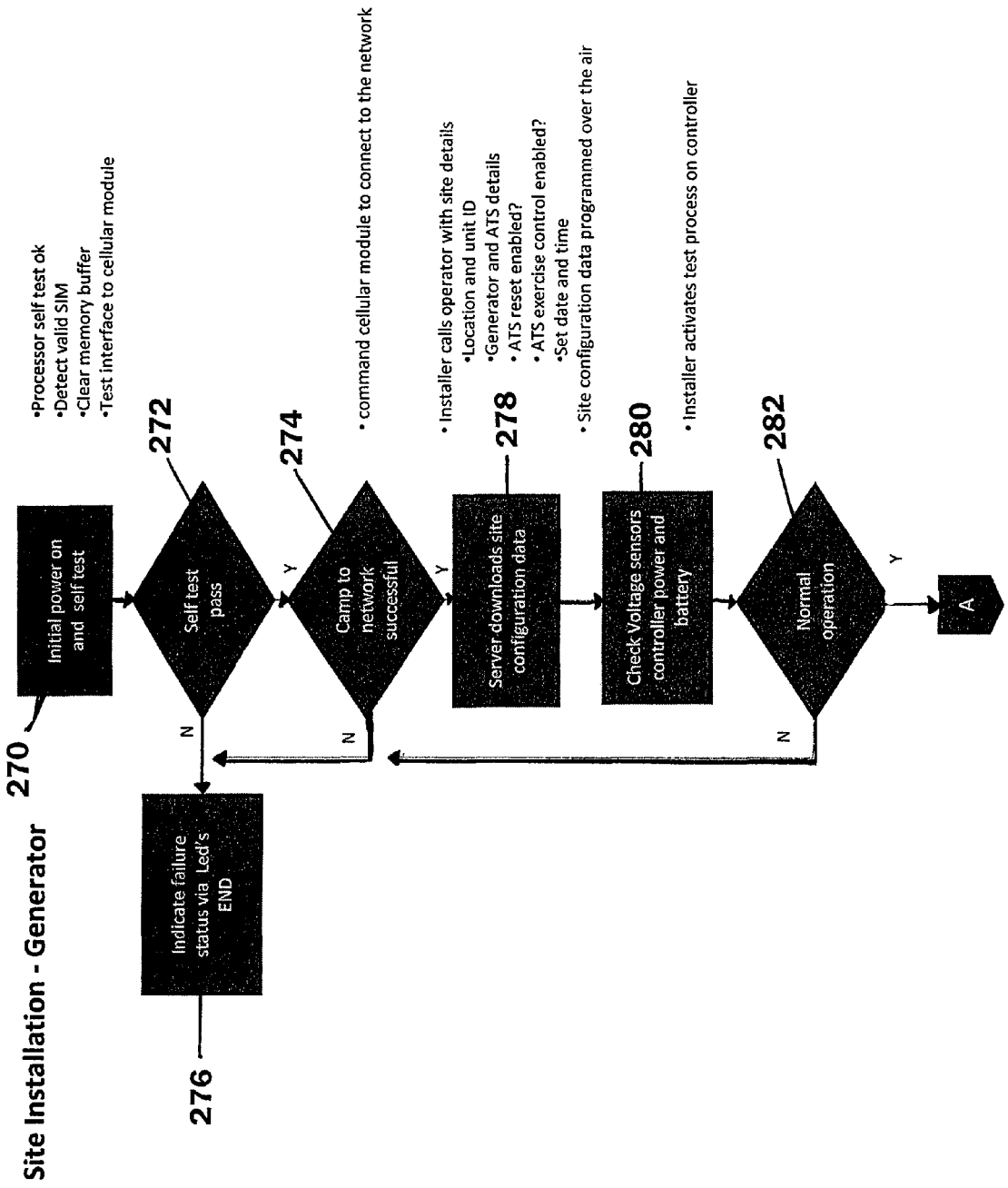
FIGS. 18-27 are a series of flowcharts illustrating the various operations carried out by the remote backup power monitor/control system of the present invention.

Referring to FIG. 16a, there is shown a block diagram of the remote portion of the backup power monitor/control system 210 shown in FIG. 16. Remote backup power monitor/control system 210 includes a utility power connection 212 coupled to a utility power source (not shown for simplicity) which powers a load center 214. Load center 214 receives and distributes the utility power as desired. In the present example, load center 214 in a typical home is a 200 amp load center with two 100 amp connections to the utility, with one half of the circuits connected to the load center operating off of one 100 amp connection and the other half of the circuits operating off of the other 100 amp connection. However, the present invention is adapted for use with a wide range of home installations, e.g., 50 amp, 60 amp, 100 amp, 150 amp etc. Load center 214 thus provides utility power to various peripheral circuits which are not shown in the figure for simplicity. The backup power portion of the remote back-up power monitor/control system 210 includes an Automatic Transfer Switch (ATS) 216 coupled to a backup generator 220. A remote monitor/controller 218 is connected to ATS 216 for monitoring the operational performance of the ATS and generator, and monitoring other associated electrical devices such as the operational status of sump pumps.

Remote monitor/controller 218 is in RF communication with a GSM network 220 which includes a server 226 as in the previously described embodiment of the present invention. Internet server 226 is in communication with plural PCs 228a-228d. Communication between remote monitor/controller 218 and GSM network 224 and the operation of server 226 and PCs 228a-228d in communicating in the Internet network are as previously described in terms of the first embodiment discussed above.

Additional details of remote monitor/controller 218 in the remote backup power monitor/control system 210 of this embodiment of Applicant's invention are illustrated in FIG. 16a. Remote monitor/controller 218 includes a primary power supply 225, an SIM interface circuit 228, an RF antenna 230, a processor 232, a cellular module 234, a backup battery 236, and a power management unit 238. Each of these components is comprised of, and operates in the same manner as, the corresponding components of the billboard lighting system remote monitor/controller 18 described above.

ATS 216 monitors utility input power, detects any failures in utility input power, provides a startup command to generator 220 in the event of loss of utility power, switches generator power to the load center 214 and disconnects utility power connection 212 from the load center. Remote monitor/control 218 further includes first, second and third sensors: a utility power sensor 221, a load sensor 222, and a generator start sensor 223. Utility power sensor 221 is coupled between utility power connection 212 and load center 214 and detects the voltage between these two components. Load sensor 222 is connected between load center 214 and ATS 216 and detects the voltage between these two components. Generator start sensor 223 is connected between ATS 216 and generator 220 and detects the voltage between these two components and is also used to monitor the generator exercise cycle. Each of these sensors is of the voltage sensing type as illustrated in FIG. 6 and described in detail above. Remote monitor/controller 218 has the ability to interface with certain ATS controller 216a for the purpose of remotely setting the exercise cycle and resetting ATS 216 faults. Load sensor 222 is normally monitoring utility power passing through the ATS to the load center. In the event of a utility failure this voltage will go to zero and ATS 216 will initiate the start of generator 220 and then switch the generator supply to the load sensor 222 by detecting the voltage to the load center after the generator start sensor 223 provides positive confirmation of successful ATS operation.

Utility power sensor 221 detects the loss of utility power at the output of the utility power connection 212 in both of the 100 amp cables coupling the utility power connection to load center 214. If either of these utility input power cables loses voltage, an appropriate signal is provided from utility power sensor 221 to the remote monitor/controller's processor 232 similar to the loss of current in the billboard lighting system described above. A simple logic circuit may be coupled across the two utility power input cables to provide a single output to processor 232 in the event of loss of voltage on either of these cables.

Another function of remote monitor/control 218 is monitoring of operation of a primary water sump pump 240 where a sump pump sensor 242 detects failure of the sump pump by monitoring the water level in the sump pit and provides immediate notification to the system operator and by text message to selected individuals.

Remote monitor/controller 218 in this embodiment of the present invention is capable of independently monitoring utility power, generator 220 operation, ATS 216 operation, and sump pump 240 operation at various points in the system. In response to receipt of an input from one or more sensors 221, 222, 223 and 242, remote monitor/controller 218 generates an alert to indicate a problem with the operation of any of the aforementioned components, as well as an indication of where the problem is. Remote monitor controller 218 is also capable of resetting ATS 216 by providing an appropriate input to its internal controller 216a so that it provides the correct control signals to load center 214. Resetting is primarily to correct a failure or a lock up situation with the ATS logic. If this occurs, the ATS may fail to switch the generator power to the load and resetting will clear a fault condition and enable it to resume normal function. Remote monitor/controller 218 is also capable of remotely programming ATS 216 via an appropriate input to its internal controller 216a. For certain ATS models the exercise cycle timer can be programmed remotely to automatically test generator 220 operation periodically, such as every 7 or 14 days, by specifying the day and time to initiate this exercise cycle and monitors generator operation to ensure that it is functional. Appropriate alerts are provided on one or more of PC terminals 228a-228d for viewing by a system operator(s).

In one embodiment, utility power sensor 221 is in the form of two separate sensors, each inductively coupled to a respective one of the first and second power input cables. In this embodiment, the two first sensors provide first and second utility L1 and utility L2 inputs to a remote monitor/controller circuit board as shown in FIG. 17. Third and fourth load L1 and generator L1 inputs are respectively provided to the remote monitor/controller 218 from load sensor 222 and generator start sensor 223. This arrangement of four sensor inputs to remote monitor/controller 218 for analysis is shown as a fault condition table 250 in FIG. 17. At the top of fault condition table 250 are listed the four sensor inputs to remote monitor/controller 218 as utility L1, utility L2, load L1 and generator L1. Listed under the "Status" column are the various conditions of the remote backup power monitor/controller system 218 depending upon the aforementioned four parameters sensed and processed by the remote monitor/controller 218. For example, Group 1 States 252 represent various conditions during normal operation of the remote backup power monitor/control system 218. During normal operation, both utility inputs L1 and L2 are available and the load L1 is energized by the utility power input. In this state, generator L1 is off. In the event of a utility power failure, utility L1 and/or utility L2 inputs are lost, load L1 is not energized and generator L1 remains off. Failure of the generator to start within two minutes following utility power failure constitutes a generator failure. If generator 220 starts within the two minutes of utility power failure, the system then monitors ATS 216 and if the ATS does not provide generator power to load center 214, an ATS failure is indicated. If ATS 216 has not failed, then ATS will connect emergency power to load L1 from generator 220 to load center 214. After utility power is restored, ATS 216 provides a stop signal to generator 220.

Group 2 States 254 shown in fault condition table 250 correspond to a generator exercise routine carried out during normal remote backup monitor/control system 210 operation. During the generator exercise routine as utility power inputs are provided to load center 214 as load L1, generator operation is tested and a report regarding generator status is provided to personal computers 228a-228d via server 226.

Group 3 States 256 in fault condition table 250 illustrate the various states of operation of remote backup power monitor/control system 210 in the event of failure of the utility L2 power input. The first Group 2 State indicates normal system operation, followed by failure of the utility L2 power input. Again, generator 220 is allowed two minutes to initiate operation, whereupon power is provided from the generator via ATS 216 to load center 214. If generator 220 does not initiate operation within two minutes of loss of the utility L2 power input, the system provides a generator failure indication. Following the start of generator 220 within two minutes of loss of the utility L2 power in put, ATS 216 is switched by remote monitor/controller 218 to an emergency state allowing power from generator 220 to be provided to load center 214. Following restoration of utility L2 input power, ATS 216 provides a stop signal to generator 220 for discontinuing generator operation. The operation of the remote backup power monitor/control system 210 in the event of failure of the utility L1 power input is shown by the Group 4 States 258 in fault condition table 250 and is similar to that of the operation of the system in the event of failure of the utility L2 power input and therefore is not explained in detail herein.

The Group 5 State 260 shown in fault condition table 250 represents a default of ATS 216, wherein utility power is provided on the utility L1 and L2 inputs, but power is not delivered to load center 214. Also shown in the lower portion of fault condition table 250 are three alerts generated by the remote monitor/controller 218. These alerts include a loss of power to controller alert, a low battery alert, and a sump failure.

Referring to FIGS. 18-27, there are shown a series of operating routines carried out by the remote backup power/monitor control system 210 under the control of remote monitor/controller 218. The various operations illustrated in FIGS. 18-26 are carried out by the remote monitor/controller 218 under the control of an operating program stored in its processor 232. Processor 232 responds to inputs from various other components of the remote monitor/controller 218 as well as to inputs from the four sensors 221, 222, 223 and 242 for providing appropriate output signals to the controller 216a of ATS 216 in exercising control over the various components of the remote backup power monitor/control system 210.

More specifically, a remote site installation routine is initiated at step 270 by initializing power and undergoing a self-test of the remote backup monitor/control system 210 including its remote monitor/controller 218. A self-test of the remote monitor/controller's processor 232 is carried out and its memory buffer is cleared. The program stored in processor 232 also detects a valid SIM signal by means of SIM interface circuit 227 and tests the operation of cellular module 234 for connecting to GSM network 224. The program then at step 272 determines if the self-test of processor 232 was successful. If not successful, the program proceeds to step 276 for indicating a failure status on LED status indicators 57 of remote monitor/controller 218. If at step 272 it is determined that the processor self-test was carried out successfully, the program proceeds to step 274 for directing the remote monitor/controller's cellular module 234 to connect to GSM network 224. If cellular module 234 is unable to connect to the GSM network 224, the program proceeds to step 276 to indicate a failure by illuminating the aforementioned LED status indicators 57. If cellular module 234 successfully connects to GSM network 224, the program proceeds to step 278 for downloading to processor 232 from server 226 configuration data specific to the site being set up. For example, site details such as the site location and unit identification indicia, and generator and ATS operating details are downloaded from server 226 to processor 232. In addition, ATS 216 reset is enabled and the ATS exercise test control is also enabled. Finally, the date and time are provided from server 226 to the remote monitor/controller's processor 232. This site configuration data is provided wirelessly from server 226 to remote monitor/controller 218 via GSM network 224.

Following downloading of this site specific configuration data, the program proceeds to step 280 and checks each of the voltage sensors 221, 222, 223 and 242, as well as remote monitor/controller 218. The program then proceeds to step 282 and determines if the voltage sensors, remote monitor/controller power supply 225, and backup battery 236 have checked positively and are experiencing normal operation. If any of the aforementioned system components are not experiencing normal operation as determined at step 282, the program proceeds to step 276 to indicate a failure by illuminating the aforementioned LED status indicators 57. If at step 282 it is determined that the aforementioned components are in normal operation, the program proceeds to point A for initiating normal operation of the remote backup power monitor/control system 210 as shown in FIG. 20.

Figure 19:
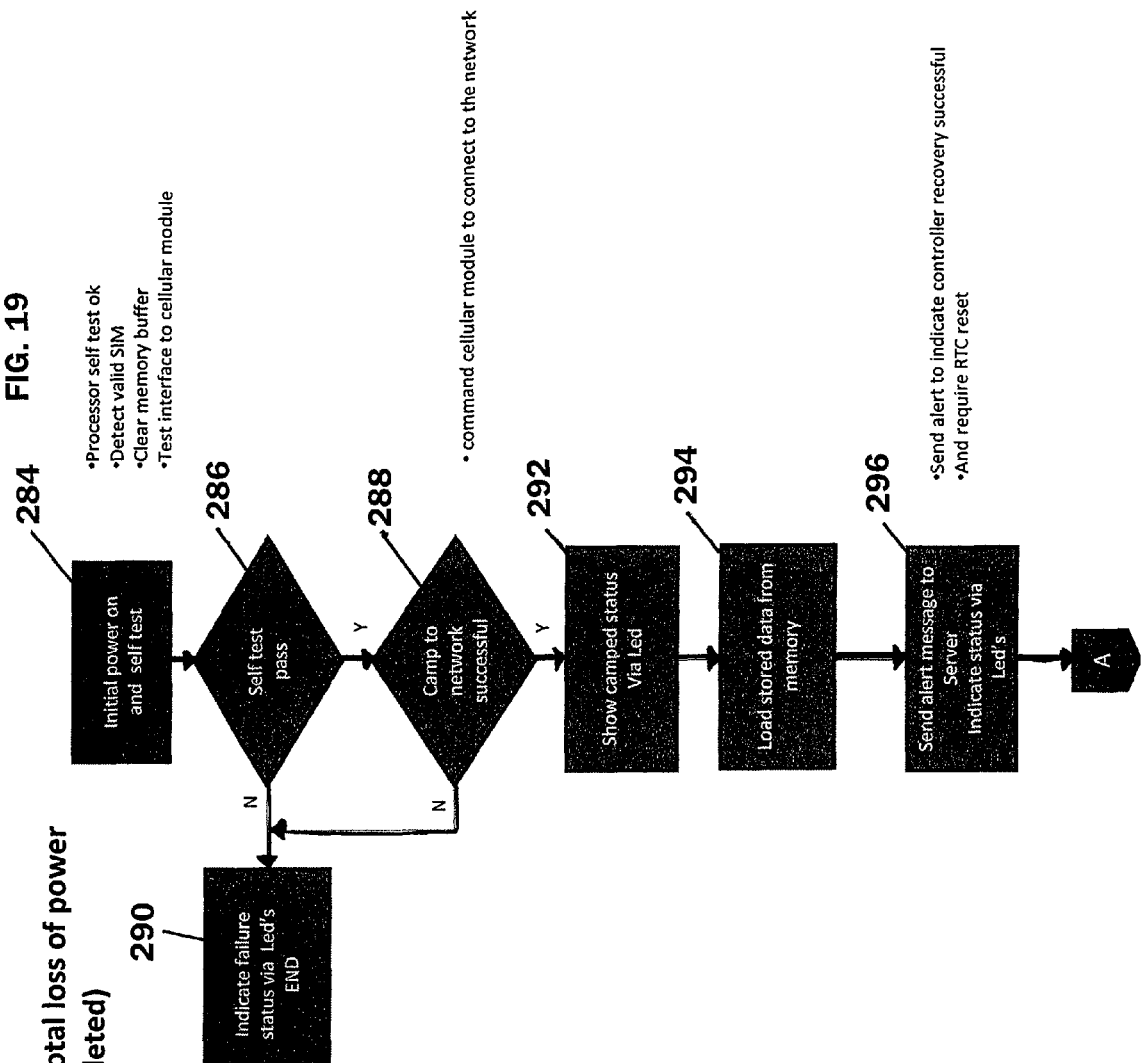

Referring to FIG. 19, there is shown the sequence of steps carried out in power on/startup after a total loss of power to the remote monitor/controller 218 with the battery depleted. This condition occurs following utility power failure and failure of generator 220 or ATS 216 for such a period of time that the controller backup battery 236 becomes depleted. This sequence is initiated at step 284 wherein the initial power on and self-test procedure of the remote monitor/controller 218 is carried out as described above. The program then proceeds to step 286 to determine if the self-test was successful, and if so, proceeds to step 288 for directing cellular module 234 to connect to GSM network 224 as previously described. If at either step 286 or at step 288 is it determined that either the self-test was unsuccessful or there was a failure to successfully connect to GSM network 224, the program branches to step 290 for indicating a failure on LED status indicators 57 and the operating program is terminated. If at steps 286 and 288 it is determined that the self-test was successfully passed and connection to the GSM network 224 was established, the program proceeds to step 292 for providing a visual indication of this status on LED status indicators 57. The program then proceeds to load stored data into the remote monitor/controller's processor 232 from EEPROM 49. This data includes site identification, SIM identification, ATS configuration, and RTC information. The program then sends an alert message to server 226 to indicate that remote monitor/controller 218 has successfully recovered and provides an indication of this on the LED status indicators 57 and proceeds to point A for initiating normal operation as shown in FIG. 20.

Figure 20:
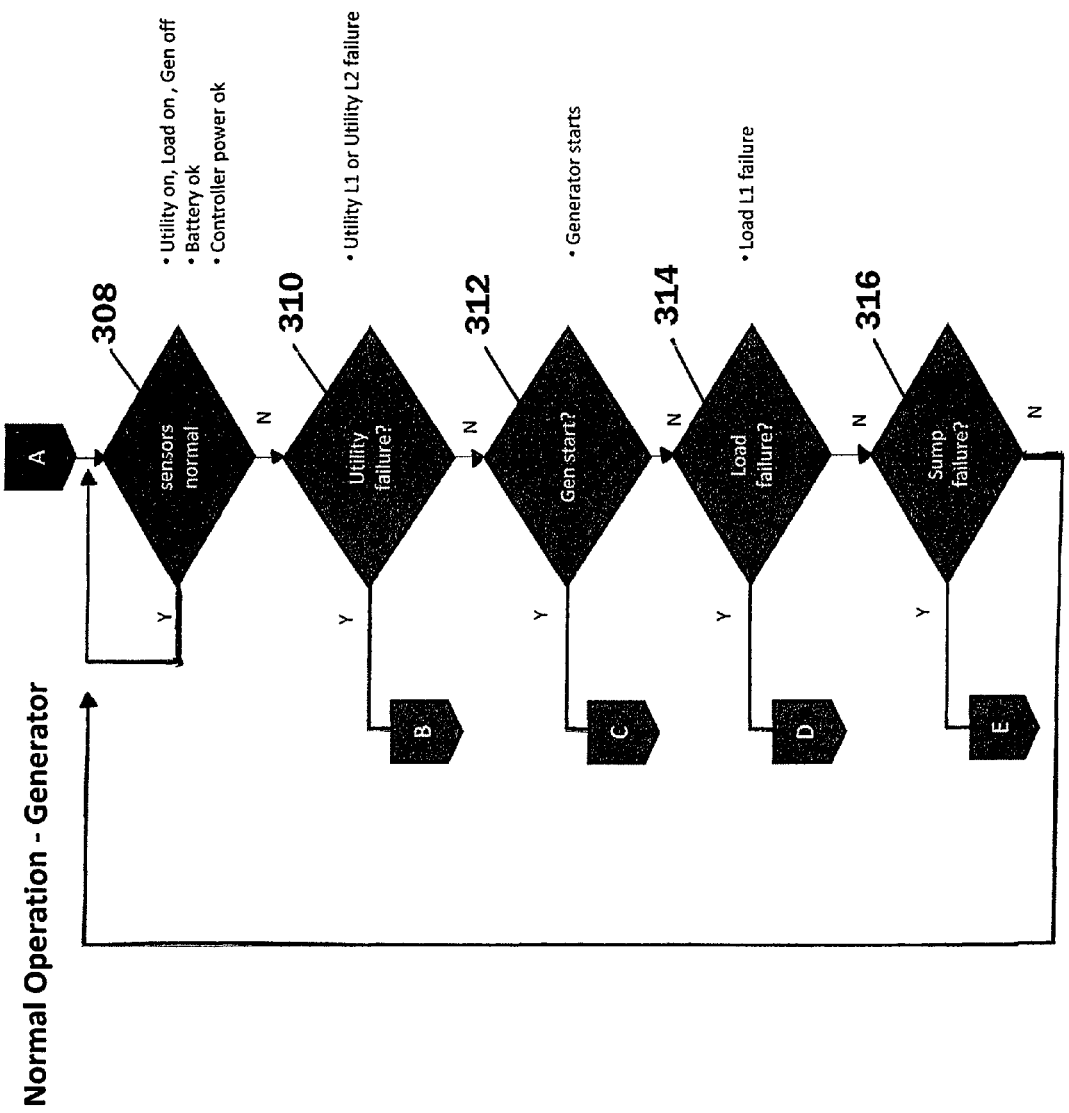
Figure 21:
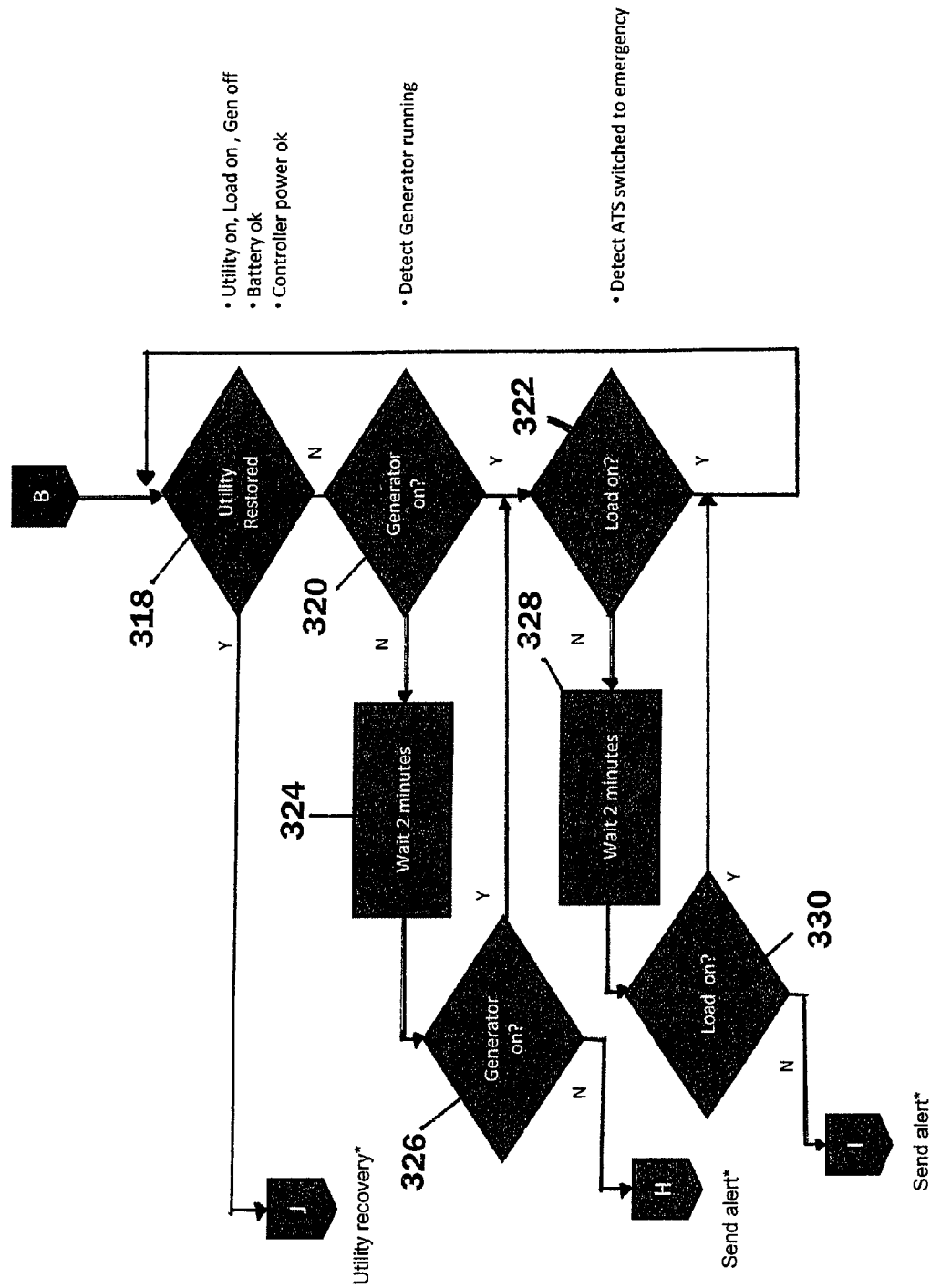
Figure 24:
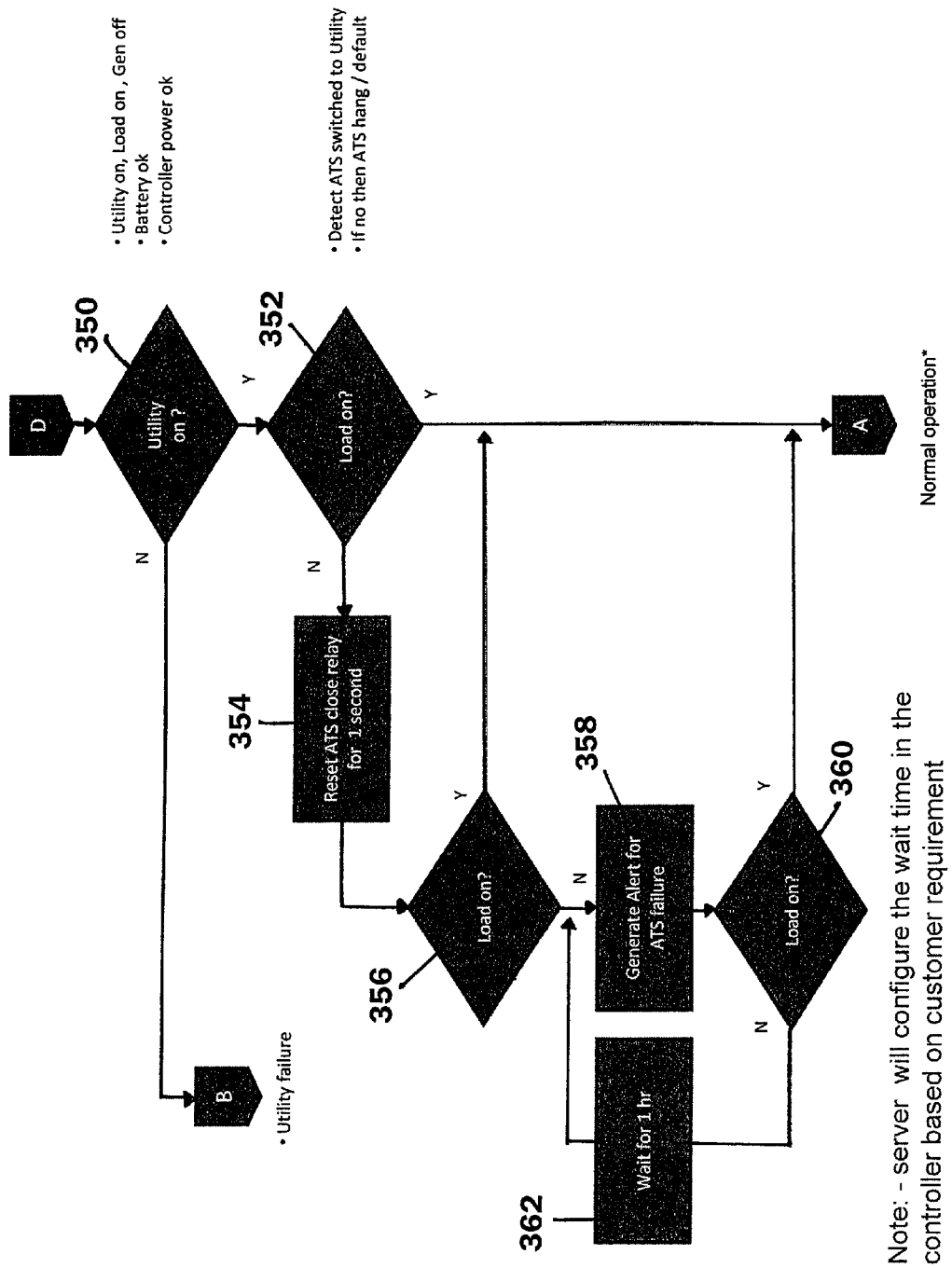
Figure 27:
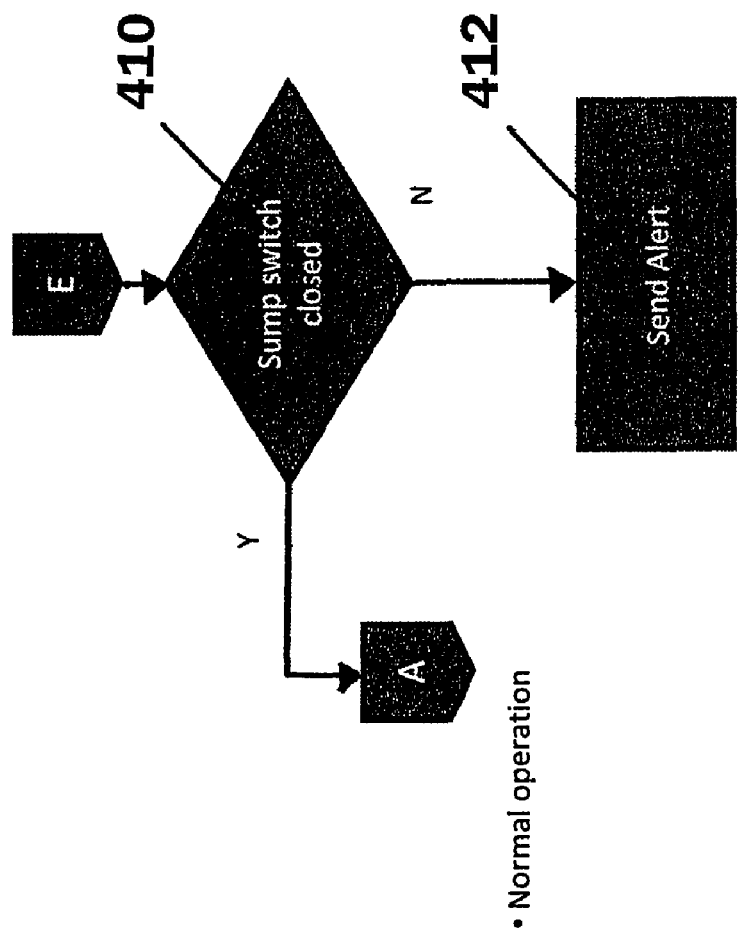

FIG. 20 illustrates the series of steps carried out during normal operation of the remote backup power monitor/control system 210. At step 308, sensor operation is examined to determine if it is experiencing normal operation. In this step, the availability of utility power is checked, as is the operation of load center 214, generator 220, the remote monitor/controller's power supply 225 and backup battery 236. If the utility power and load 214 are on and generator 220 is off, and power supply 225 and backup battery 236 as well as sensors 221, 222, 223 and 242 are in a normal state of operation, the program executes a loop involving step 308 and continues to monitor for a break in the normal operation of the aforementioned components. If at step 308, an operating problem is detected for any of sensors 221, 222, 223 or 242, or any other components of remote monitor/controller 218, the program branches to step 310 and determines if there has been a failure of either the utility L1 or utility L2 power inputs. If a failure of one of these power inputs is detected, the program proceeds to point B for initiation of a utility failure routine as shown in FIG. 21. If utility failure is not detected at step 310, the program proceeds to step 312 to detect if generator 220 has started. If it is determined that generator 220 has started, the program branches to point C. If at step 312, it is determined that generator 220 did not start, the program proceeds to step 314 and checks for a load failure. If it is determined at step 314 that there is no power provided to load center 214, the program branches to point D and initiates a load failure test sequence as shown in FIG. 24. If at step 314, it is determined that the load L1 has not failed, the program proceeds to step 316 to determine if there has been a sump pump failure. If it is determined at step 316 that there has been a sump pump failure, the program proceeds to point E to process sump pump failure as shown in FIG. 27.

Figure 22:
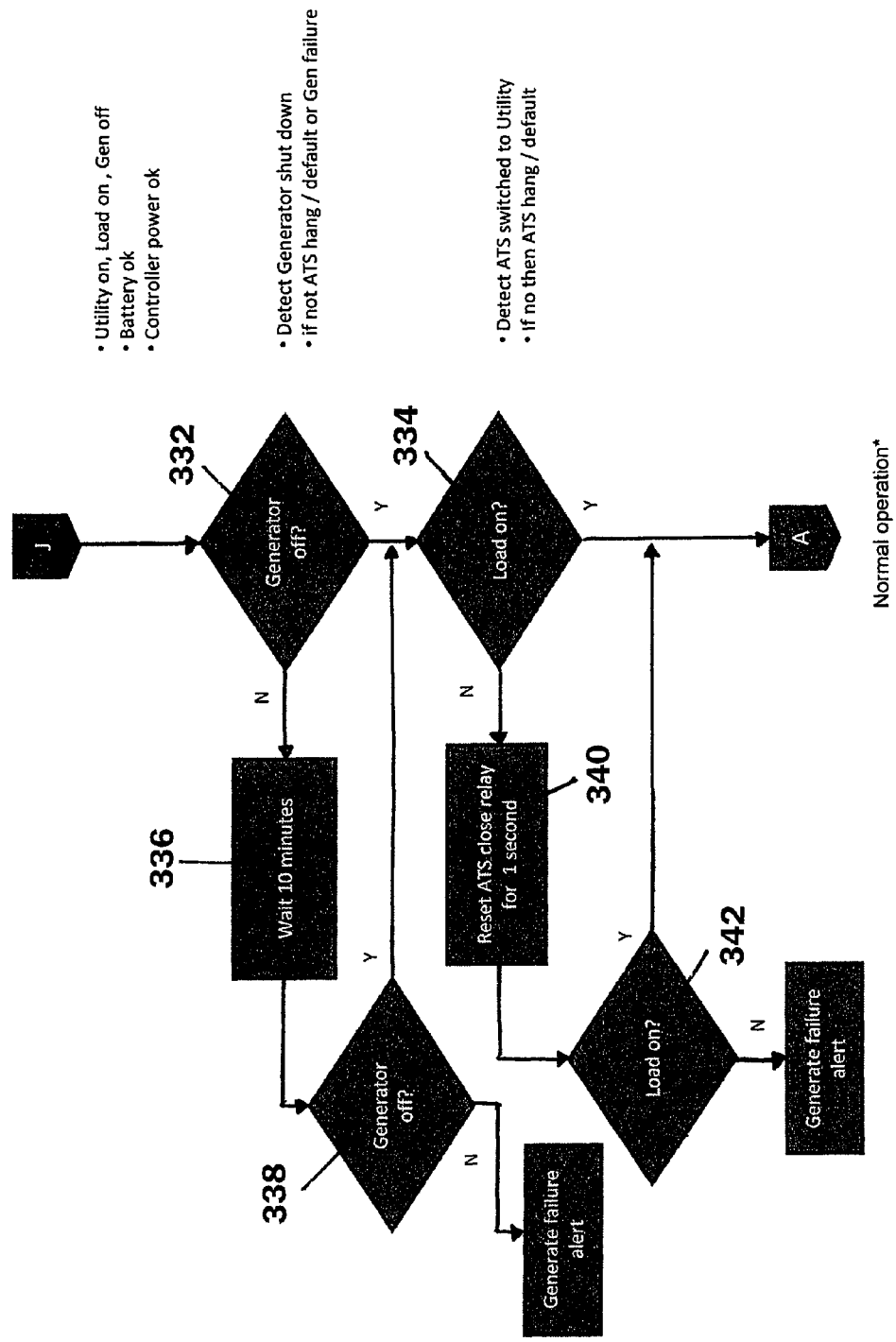

In the event of detection of a utility power failure, the sequence of operations illustrated in FIG. 21 is executed. The utility failure test sequence is initiated at step 318 where the program attempts to detect restoration of utility power. If utility power restoration is detected at step 318, the program proceeds to point J and initiates execution of a utility recovery routine as shown in FIG. 22. If at step 318, it is determined that utility power has not been restored, the program proceeds to step 320 to determine if generator 220 is operating. If at step 320, it is determined that generator 220 is on, the program proceeds to step 322 for determining if the load center 214 is on. If it is determined at step 320 that the generator 220 is on, the program proceeds to step 322 to determine if load center 214 is on. If load center 214 is on, the program executes a loop and returns to step 318 to again attempt to determine if utility power has been restored. This loop continues so long as generator 220 and load center 214 are on and utility power has not yet been restored.

If at step 320, it is determined that generator 220 is not on, the program proceeds to step 324 for waiting for two minutes to again determine if the generator is on at step 326. If at step 326 it is again determined that generator 220 is not on, the program generates an alert. If at step 326 it is determined that generator 220 is on, the program proceeds to step 322 for determining if load center 214 is on. If the load center 214 is determined to be on, the program returns to step 318 and executes a loop for attempting to detect utility power restoration as previously described. If at step 322, it is determined that the load center 214 is not on, the program branches to step 328 and introduces a two minute waiting period before again attempting to determine if the load center 214 is on at step 330. If at step 330 the load center 214 is determined to be on, the program proceeds to step 318 for executing the aforementioned loop for detecting the restoration of utility power. If at step 330 it is determined that load center 214 is not on, the program generates an alert.

The utility recovery routine shown in FIG. 22 is undertaken upon the restoration of utility power with the load center 214 ON, generator 220 ON, and the remote monitor/controller's power supply 225 and backup battery 236 normal. The utility recovery routine is initiated at step 332 with a determination of the status of generator 220. If generator 220 is OFF, the program proceeds to step 334 to determine if the load center 214 is ON. The program then first detects if ATS 216 is switched to the utility mode of operation. If ATS 216 is not switched to the utility mode of operation, the program attempts to reset ATS 216 to the utility mode of operation at step 340. The program then proceeds to step 342 to determine if the load is ON. If the load center 214 is ON, the program proceeds to point A for initiating the normal operation sequence as shown in FIG. 20.

If at step 332 it is determined that generator 220 is not shut down, the program proceeds to step 336 for introducing a ten minute waiting period following which another attempt is made at step 338 to determine if the generator is OFF. If at step 338 it is determined that generator 220 is OFF, the program proceeds to determine if the load center 214 is ON at step 334 as previously described. If at step 338 it is determined that generator 220 is not OFF, the program generates an alert. If at step 334 it is determined that load center 214 is not ON, the program proceeds to step 340 for resetting ATS 216. Upon the resetting of ATS 216, the program again attempts to determine if load center 214 is ON at step 342 and proceeds to point A if it is determined that the load center is ON. If at step 342 it is determined that the load center 214 is not ON, the program generates an alert.

Figure 23:
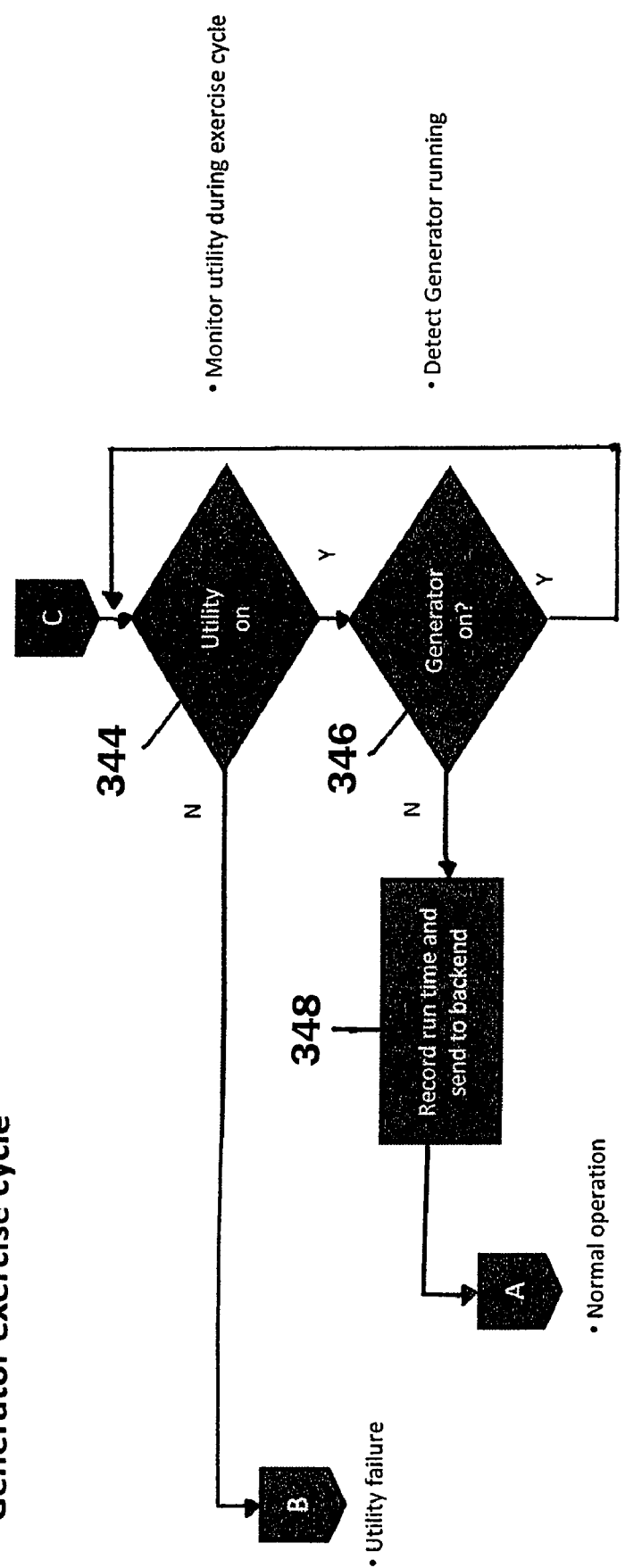

Referring to FIG. 23, there is shown the series of steps in the operation of the remote backup power monitor/control system 210 in monitoring and reporting on the generator exercise cycle which is required to ensure that it operates as intended. The generator exercise cycle sequence is initiated by the monitor/control system 210 detecting a generator start as illustrated in FIG. 20 at step 344 in FIG. 23 with a determination if utility power is available. If utility power is determined at step 344 to be not available, the monitor/controller determines if the generator started in response to a utility failure and proceeds to point B for initiating the utility power failure sequence illustrated in FIG. 21 and described above. If at step 344 it is determined that utility power is ON, the monitor/controller determines if the generator started in response to an exercise cycle and proceeds to step 346 for determining if the generator is still on.

If generator 220 is determined to be ON at step 346, the program continues to monitor utility status at step 344 and generator status at step 346. If a utility failure is detected at step 344, the generator exercise cycle is aborted and the program branches to point B to execute the utility power failure sequence illustrated in FIG. 21. If there is no utility failure when the generator stop is detected at step 346, the program records the exercise cycle event and run time and transmits this information to server 226. The program then proceeds to point A for initiating the normal generator operation routine illustrated in FIG. 20 and described above.

Referring to FIG. 24, there is shown the load failure-utility power on routine executed under the control of the operating program stored in the remote monitor/controller's processor 232. The load failure-utility power ON sequence is initiated at step 350 with a determination of the presence of utility input power. If it is determined that utility power is ON, the program proceeds to step 352 for determining if ATS 216 is switched to the utility power mode of operation and that ATS is operating normally. If all of the remote monitor/controller's aforementioned components are determined to be normal in operation, the program proceeds to point A for initiating normal operation as shown in FIG. 20. If at step 350 it is determined that utility power is not ON, the program proceeds to point B for initiating the utility failure sequence shown in FIG. 21. If at step 352 it is determined that the load center 214 is OFF, with ATS 216 switched to the utility input power mode of operation, this indicates that the ATS 216 is hung up or in default. The program then resets ATS 216 at step 354 for one (1) second and again attempts to determine if load center 214 is ON at step 356. If it is determined that the load center 214 is ON at step 356, the program proceeds to point A for initiating normal operation of the system. If at step 356 it is determined that the load center 241 is OFF, the program proceeds to step 358 and generates an alert indicating ATS failure. The program then again attempts to determine if the load center 214 is ON at step 360, and, if so, proceeds to point A for initiating normal operation. If at step 360 it is again determined that load center 214 is OFF, the program initiates a waiting period of one hour at step 362 and again generates an alert indicating ATS failure at step 358 and again proceeds to step 360 in attempting to determine if the load center 214 is ON. The program remains in this ATS failure loop sending alerts every hour until it is corrected such as by ATS resetting and the load center is determined to be ON at step 360. Once it is determined that load center 214 is ON at step 360, the program proceeds to point A for initiating the normal operation sequence shown in FIG. 20.

Figure 25:
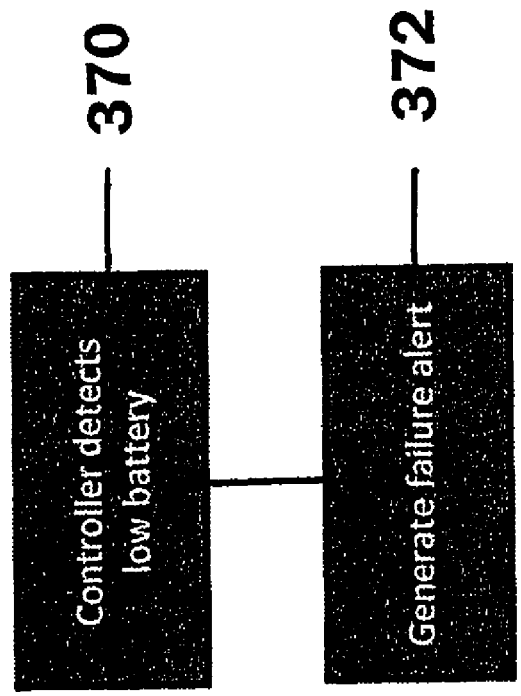

Referring to FIG. 25, there is shown the battery low or controller power failure sequence which is executed upon detection of a battery or power failure. The battery low or controller power failure sequence is initiated at step 370 with a determination that controller battery's charge is low. The program then proceeds to step 372 for providing a visual alert of this condition on LED status indicators 57.

Figure 26:
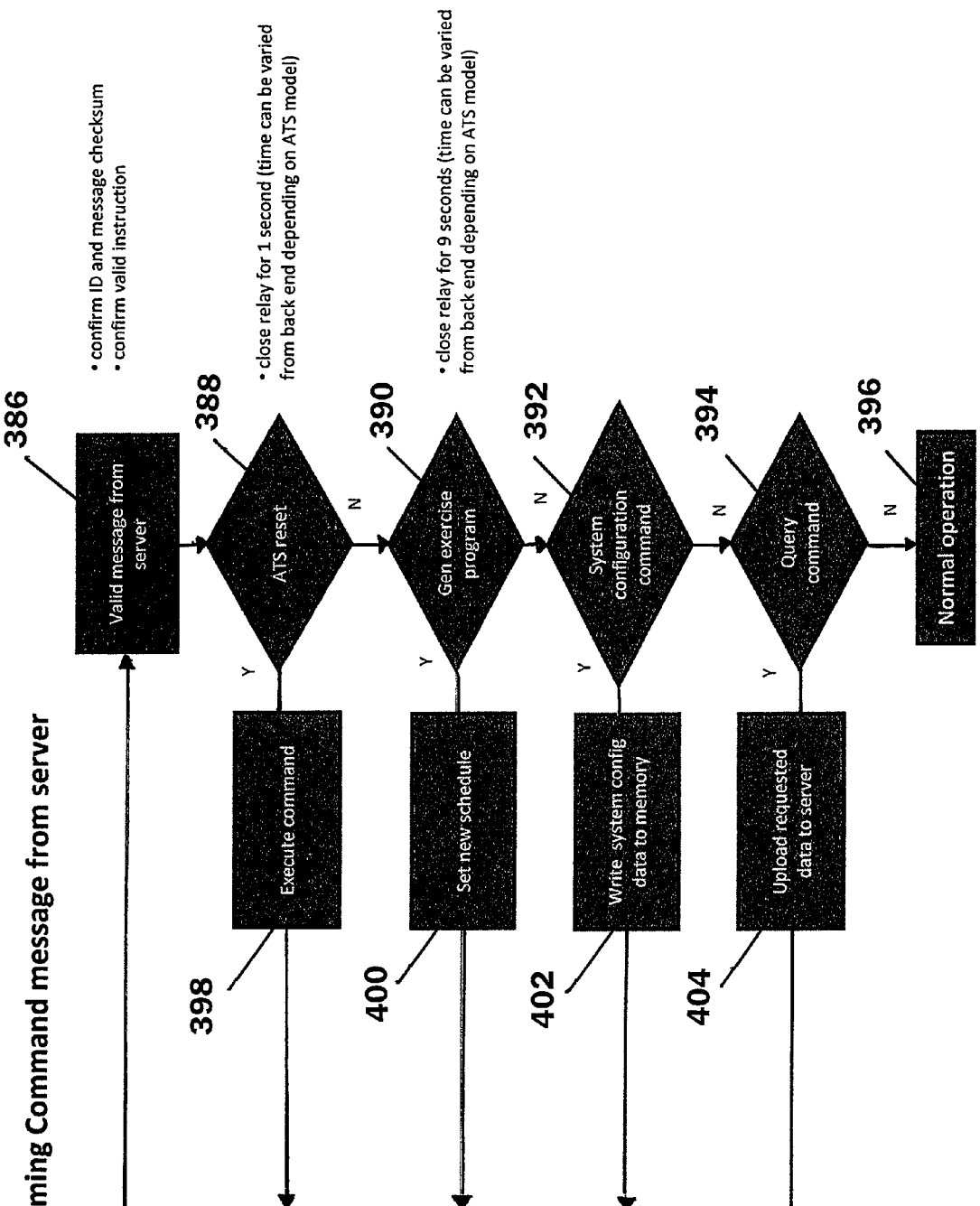

Referring to FIG. 26, there is shown the sequence of steps involved in receiving an incoming message at the remote monitor/controller 218 from server 226. At step 386, a valid message is received at remote monitor/controller 218 from server 226. The program then determines if the received message includes an ATS reset command at step 388. If the received message contains an ATS reset command, the command is executed at step 398 by resetting ATS 216 and the program returns to step 386 to await receipt of another valid message from server 226. If at step 388 it is determined that the received message did not include an ATS reset command, the program proceeds to step 390 to determine if the received message includes a generator exercise program command. If it is determined that the received message includes a generator exercise program command, the program proceeds to step 400 for turning on generator 220, setting a new generator schedule, and returns to step 386 for awaiting receipt of another valid message from server 226.

If at step 390 it is determined that the received message did not include a generator exercise program command, the program proceeds to step 392 to determine if the received message includes a system configuration command. If it is determined that the received message includes a system configuration command, the program branches to step 402 and proceeds to write the new system configuration data to the memory of the remote monitor/controller's processor 232 for executing the change. The program then proceeds to step 386 for awaiting receipt of another valid message from server 226. If at step 392 it is determined that the received message did not include a system configuration command, the program proceeds to step 394 for determining if the received message includes a query command. If it is determined that the received message includes a query command, the program branches to step 404 and uploads the requested data from remote monitor/controller 218 to server 226 and proceeds to step 386 for awaiting receipt of another valid message from server 226. If at step 394 it is determined that the received message also did not include a query command, the program proceeds to step 396 for initiating normal system operation as shown in FIG. 20.

Referring to FIG. 27, there is shown the sequence of steps carried out in accordance with the operating program stored in the remote monitor/controller's processor 232 in checking the operation of sump pump 240. At step 410, the program detects if the sump pump monitor switch is closed. If the sump pump's monitor switch is closed, the program proceeds to point A for initiating normal system operation as shown in FIG. 20. If at step 410 it is determined that the sump pump monitor switch is not closed, the program at step 412 generates a visual indication of this on the video display/computer and sends an alert via text message to any specified person.

Figure 28:
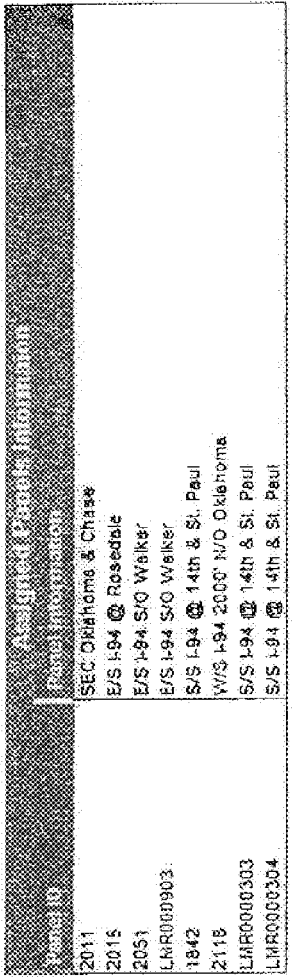
Figure 29:
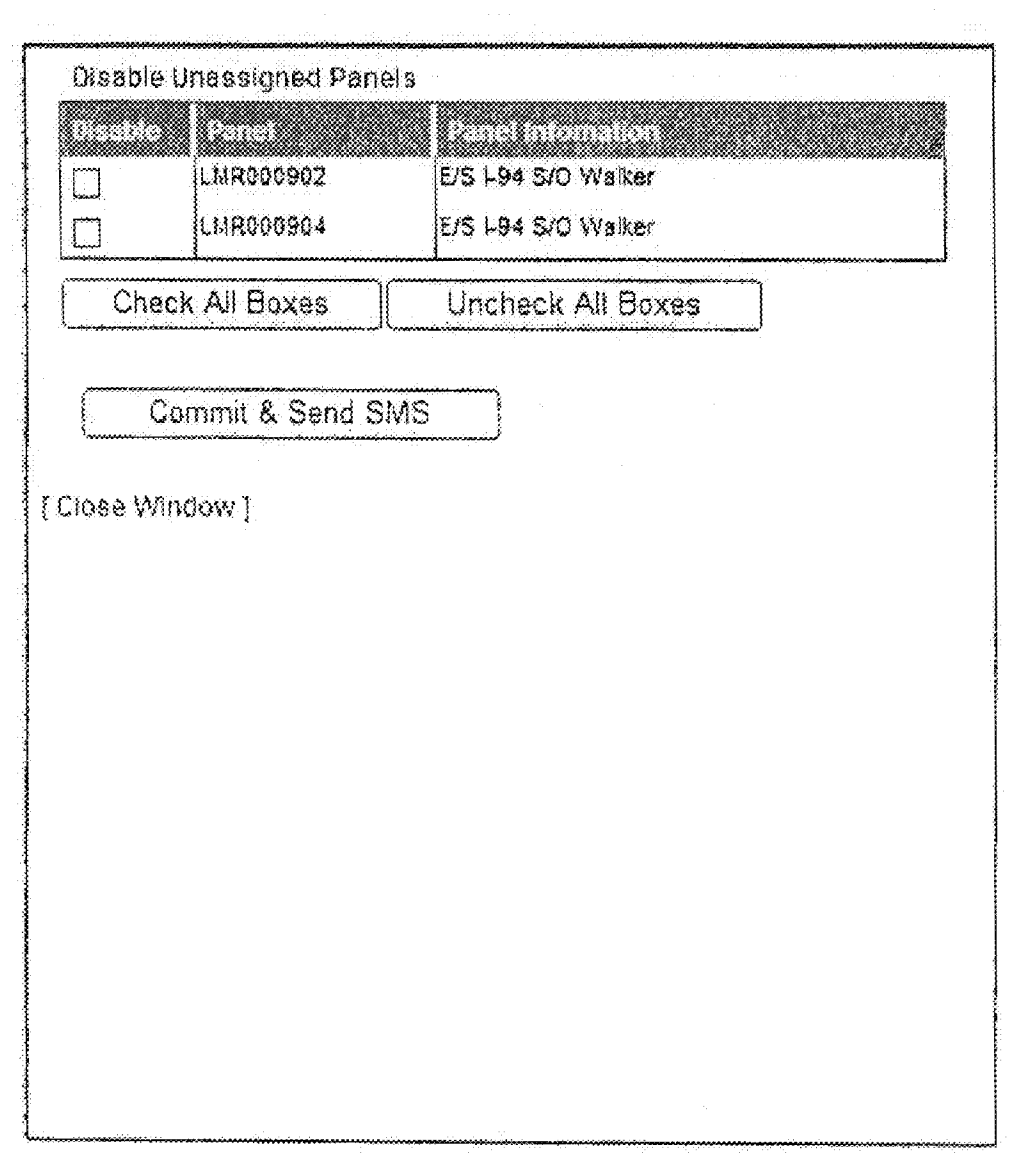
Figure 30:
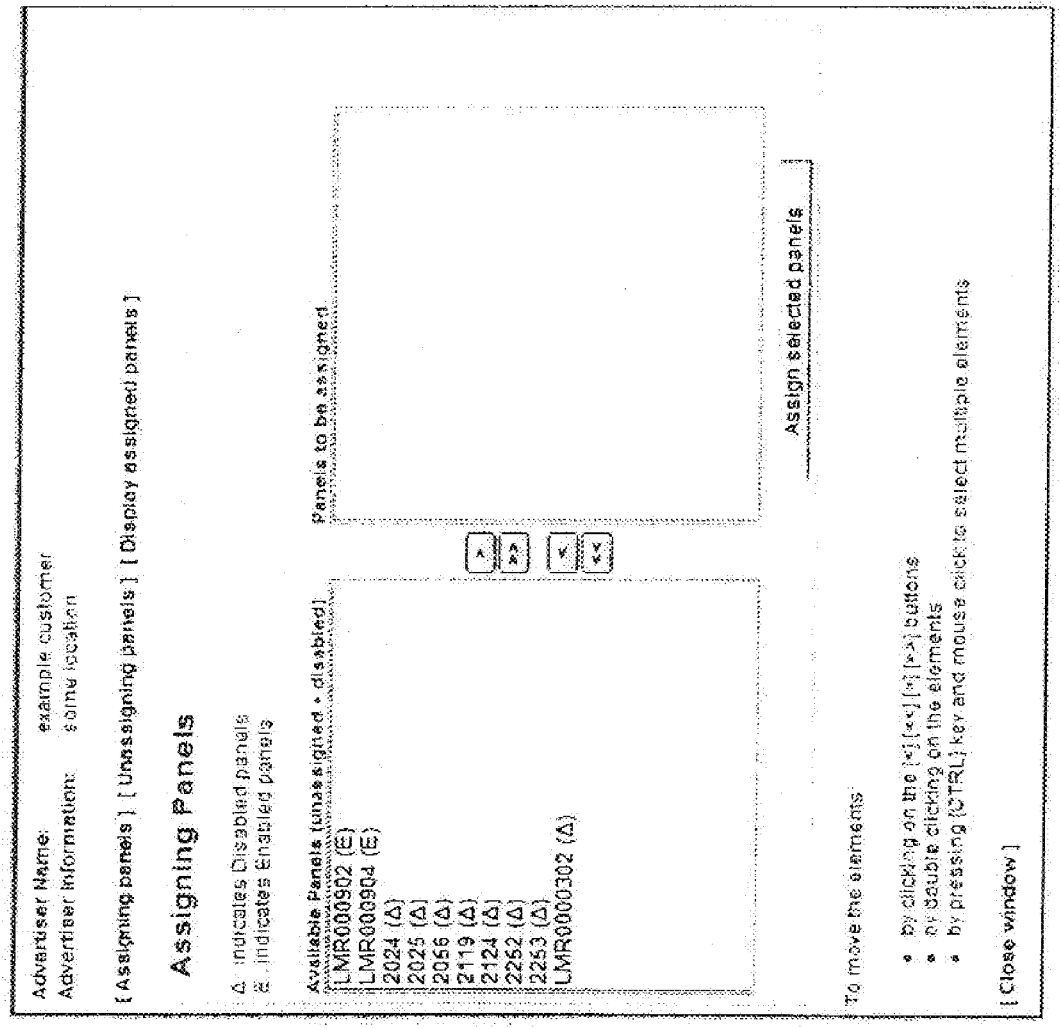
Figure 31:
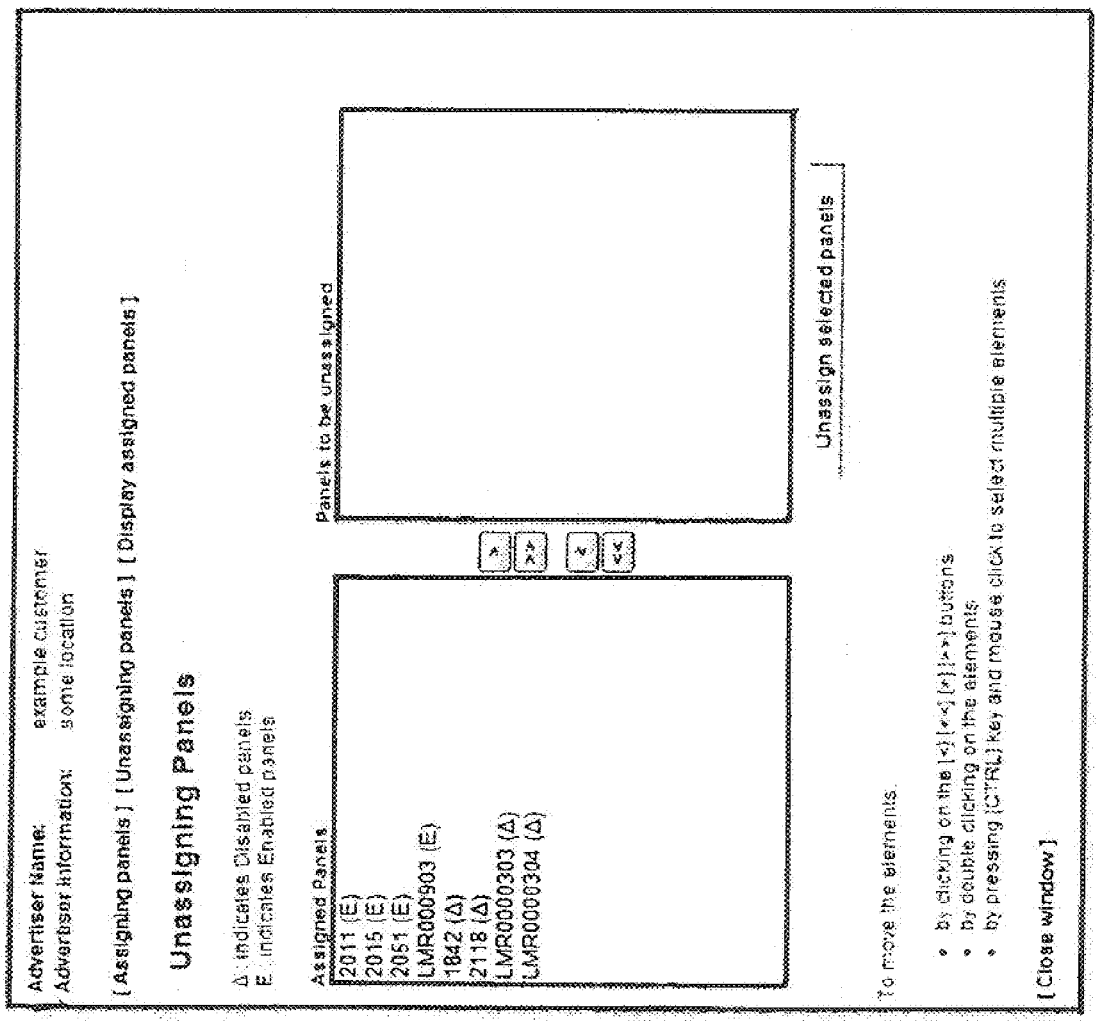

Referring to FIGS. 28-30, there are shown a series of screens on a video display for use in the first embodiment of the disclosed invention relating to the remote monitor/control system 10 for billboard lighting described above. These video display screens are useful in the remote monitor/control system 10 for billboard lighting in easily assigning or unassigning a customer to one or more billboard lighted faces by a few simple entries by a system operator. This feature of the billboard lighting remote monitor/control system 10 allows an operator to easily disable the lights of a given billboard face upon termination of the use of that billboard face by a customer. FIG. 28 shows a video display screen presenting various billboard lighting face, or panel, identification labels on the left-hand portion of the screen. To the right of these panel identification labels is specific information relating to each panel, such as the location of each of the identified billboard panels. FIG. 30 illustrates a screen used in assigning billboard panels to a customer. Available panels are listed in the left-hand portion of the screen of FIG. 30, with space provided on the right-hand portion of the screen to designate specific panels to be assigned to a customer. FIG. 31 illustrates a screen presented on a video display used for unassigning, or removing, a panel from a customer currently using the panel. Assigned panels are listed on the left-hand portion of the screen shown in FIG. 31. A panel to be unassigned to a given customer is entered on the left-hand portion of the screen shown in FIG. 31. FIG. 29 illustrates a screen presented on a video display for use in disabling the lights for a billboard lighting panel which has been unassigned, or removed, from a customer. By selecting the "DISABLE" control in FIG. 29, an operator may disable the lights for a recently unassigned display panel. Lighting panels can be deactivated upon unassigning of the panel, or may be activated when assigned to a new customer. Selection of the "DISABLE" control on the screen of FIG. 29 causes a command to be sent to the remote monitor/controller 18 which causes it to skip the programmed scheduled times discussed above until a second command is received to re-enable the specific lighted billboard face assigned to a new customer. With a typical usage rate in the billboard industry of approximately 65%, this feature of Applicant's invention which allows an operator to easily deactivate billboard lighting no longer assigned for use by a given customer will make possible energy savings on the order of 35% for a typical billboard lighting installation.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A monitor/controller for use with a remote billboard lighting system including plural billboards each having plural display faces with respective associated sets of lights for illuminating said display faces, said monitor/controller comprising:

a utility power connection for providing utility power to said sets of lights of each billboard of said plural billboards;

plural sensors each coupled to a respective set of lights of said sets of lights for providing plural output signals representing operating status of said sets of lights;

plural relays each coupled to said respective set of lights of said sets of lights;

said monitor/controller communicating with at least one central controller operating in a wireless communications network;

a programmable signal processor coupled to said plural sensors and said relays and in communication with said at least one central controller via said wireless communications network for providing information to said at least one central controller regarding said operating status of said sets of lights, and for receiving and storing lighting operation commands from said at least one central controller and providing output signals to said relays for controlling the operation of each said sets of lights, in accordance with a predetermined schedule and said operating status of said sets of lights;

wherein said programmable signal processor includes a test and calibration program initiated during installation of the monitor/controller and including determination of maximum, minimum and average current in a respective circuit connected to each of said sets of lights after operation of said sets of lights has stabilized, wherein the test and calibration program further includes determining and storing referenced calibration data for said respective circuit connected to said each of said sets of lights after operation of said sets of lights has stabilized;

wherein said programmable signal processor further includes a program for storing a site history record based upon information determined and stored by said test and calibration program for said sets of lights in said each billboard of said plural billboards;

wherein said programmable signal processor determines a reference tolerance curve comprising upper and lower tolerance limits for acceptable current level for said respective circuit connected to said each of said sets of lights in said each billboard of said plural billboards.

2. The monitor/controller of claim 1 further comprising a sensor input interface circuit coupled between said programmable signal processor and said plural sensors and responsive to said plural output signals for providing said information regarding said operating status of said sets of lights to said programmable signal processor.

3. The monitor/controller of claim 2 wherein said information regarding said operating status of said sets of lights includes light operation status information, performance information and fault condition information.

4. The monitor/controller of claim 1 further comprising a power control interface circuit coupled between said programmable signal processor and said sets of lights and including said plural relays.

5. The monitor/controller of claim 4 wherein said power control interface circuit further includes a relay connector arrangement for coupling said plural relays to said programmable signal processor.

6. The monitor/controller of claim 1 further comprising a backup power supply and a power management unit coupled to said programmable signal processor for automatically coupling said backup power supply to said sets of lights when said utility power is unavailable.

7. The monitor/controller of claim 6 wherein said backup power supply comprises a storage battery.

8. The monitor/controller of claim 7 wherein said power management unit includes a battery power control circuit coupled to said storage battery for maintaining said storage battery fully charged.

9. The monitor/controller of claim 8 further comprising a first visual display coupled to said battery power control circuit for providing a visual indication of the status of storage battery charge.

10. The monitor/controller of claim 9 wherein said first visual display comprises a light emitting diode (LED).

11. The monitor/controller of claim 6 further comprising a second visual display coupled to said power management unit for providing a visual indication of the availability of said utility power.

12. The monitor/controller of claim 11 wherein said second visual display comprises an LED.

13. The monitor/controller of claim 8 wherein said monitor/controller terminates operation of the billboard lighting system in the absence of said utility power if said storage battery power is less than 20% of normal said utility power.

14. The monitor/controller of claim 1 wherein said wireless communications network comprises a global system for mobile communication (GSM) network.

15. The monitor/controller of claim 14 further comprising a cellular module for interfacing with said GSM network.

16. The monitor/controller of claim 15 further comprising a SIM interface circuit for providing said monitor/controller with a unique identity in said GSM network.

17. The monitor/controller of claim 6 wherein said power management unit includes a linear voltage regulator for regulating a first DC input voltage for use by first components of the remote billboard lighting system to a second lower DC voltage for use by second components of said remote billboard lighting system.

18. The monitor/controller of claim 17 wherein said first DC input voltage is +6 VDC and said second lower DC voltage is +3 VDC.

19. The monitor/controller of claim 1 further comprising a signal processor connector coupled to said programmable signal processor for allowing for re-programing of said programmable signal processor.

20. The monitor/controller of claim 1 further comprising an electrically erasable programmable read only memory (EEPROM) coupled to said programmable signal processor for storing said monitor/controller operating information.

21. The monitor/controller of claim 20 wherein said operating information stored in said EEPROM includes monitor/controller configuration information, sensor measurement data, scheduled lighting on/off times, calibration reference values, tolerance values, and real time clock (RTC) information.

22. The monitor/controller of claim 1 wherein each of said plural sensors is a current sensor for sensing current level in said respective set of lights.

23. The monitor/controller of claim 1 wherein said programmable signal processor includes a self-test program initiated upon start-up of said monitor/controller to test operation of said monitor/controller.

24. The monitor/controller of claim 23 wherein said test operation of said monitor/controller includes testing for receipt of a valid wireless signal and clearing of a buffer memory in said programmable signal processor.

25. The monitor/controller of claim 24 further comprising at least one visual status indicator coupled to said programmable signal processor for providing a visual indication of a failure of any portion of said test operation.

26. The monitor/controller of claim 1 further comprising a video display coupled to said programmable signal processor and responsive to the current in each light circuit for providing a visual indication of the current in each circuit connected to a respective light relative to the upper and lower tolerance limits of the current level for that particular circuit.

27. The monitor/controller of claim 26 wherein said visual indication is provided to said at least one central controller via said wireless communications network.

28. The monitor/controller of claim 26 wherein said programmable signal processor periodically updates the upper and lower tolerance limits to accommodate variation in operation arising from the age of lights and other components, the geographic location of said remote billboards, and environmental changes.

29. The monitor/controller of claim 1 further comprising a video display coupled to said programmable signal processor for providing a visual alert indicating an out-of-tolerance operating state of said lighting system.

30. The monitor/controller of claim 1 further comprising a video display coupled to said programmable signal processor for displaying a comparison of current lighting system operation with prior lighting system operation.

31. The monitor/controller of claim 1 further comprising input means for allowing an operator to deactivate the lights associated with a billboard face no longer in use.

32. The monitor/controller of claim 31 wherein said input means includes a video display screen coupled to said programmable signal processor.

33. The monitor/controller of claim 32 wherein customer assigned billboard faces and unassigned billboard faces as well as individual identification indicia for the billboard faces is presented on said video display screen.

* * * * *